United States Patent
Teyeb et al.

(10) Patent No.: US 11,425,581 B2
(45) Date of Patent: Aug. 23, 2022

(54) WIRELESS DEVICE, SECOND NODE, AND METHODS PERFORMED THEREBY FOR HANDLING A FAILURE IN A SECONDARY CELL SERVING THE WIRELESS DEVICE

(71) Applicant: Telefonaktiebolaget LM Ericsson (publ), Stockholm (SE)

(72) Inventors: Oumer Teyeb, Solna (SE); Torsten Dudda, Aachen (DE); Antonino Orsino, Masala (FI); Osman Nuri Can Yilmaz, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 392 days.

(21) Appl. No.: 16/318,983

(22) PCT Filed: Sep. 27, 2018

(86) PCT No.: PCT/SE2018/050984
§ 371 (c)(1),
(2) Date: Jan. 18, 2019

(87) PCT Pub. No.: WO2019/066707
PCT Pub. Date: Apr. 4, 2019

(65) Prior Publication Data
US 2021/0195444 A1    Jun. 24, 2021

Related U.S. Application Data

(60) Provisional application No. 62/564,549, filed on Sep. 28, 2017.

(51) Int. Cl.
*H04W 24/04* (2009.01)
*H04W 76/15* (2018.01)

(52) U.S. Cl.
CPC .......... *H04W 24/04* (2013.01); *H04W 76/15* (2018.02)

(58) Field of Classification Search
CPC ......... H04L 5/0053; H04L 5/001; H04L 5/00; H04L 5/0092; H04W 72/1289;
(Continued)

(56) References Cited

U.S. PATENT DOCUMENTS

2015/0296438 A1* 10/2015 Wu .......................... H04L 45/28
                                                             370/221
2016/0227524 A1*  8/2016 Choi ....................... H04L 5/001
(Continued)

FOREIGN PATENT DOCUMENTS

EP         2934057 A1    10/2015

OTHER PUBLICATIONS

3GPP TSG-RAN WG2 Meeting #97bis, Spokane, USA, Apr. 3-7, 2017, RAN2 Chairman (Intel), Chairman Notes, 75 pages.
(Continued)

*Primary Examiner* — Syed Ali
(74) *Attorney, Agent, or Firm* — Sage Patent Group

(57) ABSTRACT

A method, performed by a wireless device is described. The method is for handling a failure in a secondary cell serving the wireless device. The secondary cell and a primary cell serve the wireless device with carrier aggregation (CA) in a wireless communications network. The wireless device determines the failure in the secondary cell. The determination is based on a determination of a radio link control failure. The wireless device initiates sending an indication to a network node. The network node is one of a first network node and a second network node. The indication is based on the determined failure of the secondary cell. A method,
(Continued)

performed by the network node is also described. The network node receives the indication and initiates a second procedure.

17 Claims, 14 Drawing Sheets

(58) Field of Classification Search
CPC . H04W 16/14; H04W 72/042; H04W 74/004; H04W 28/08; H04W 76/15; H04W 74/0833
See application file for complete search history.

(56) References Cited

U.S. PATENT DOCUMENTS

| | | | |
|---|---|---|---|
| 2016/0316508 A1* | 10/2016 | Hong | H04W 28/08 |
| 2018/0124612 A1* | 5/2018 | Babaei | H04W 72/042 |
| 2018/0124831 A1* | 5/2018 | Dinan | H04W 72/0413 |
| 2018/0367255 A1* | 12/2018 | Jeon | H04L 1/1607 |
| 2022/0060283 A1* | 2/2022 | Wang | H04L 1/08 |

OTHER PUBLICATIONS

Technical Specification Group Radio Access Network; Evolved Universal Terrestrial Radio Access (E-UTRA) and Evolved Universal Terrestrial Radio Access Network (E-UTRAN); Overall description; Stage 2 (Release 14) 3GPP TS 36.300 V14.3.0 (Jun. 2017), 331 pages.
"Discussions on Reporting SCG-RLF Towards MeNB," 3GPP TSG RAN WG2 Meeting #85bis, Valencia, Spain, Mar. 31-Apr. 4, 2014 (R2-141200), KDDI Corporation, Agenda Item 7.1.2, (XP050792437), 2 pages.
International Search Report and Written Opinion of the International Searching Authority, PCT/SE2018/050984, dated Jan. 7, 2019, 16 pages.
European Office Action Communication dated Feb. 23, 2022 for EP Application No. EP 18789511.5, 5 pages.
Takeda, Kazuaki et al., "New Radio (NR) Access Technology", 3GPP TSG RAN, Meeting #77, RP-171783, TSG RAN WG1, Sapporo, Japan, Sep. 11-14, 2017, 284 pages, XP051324353.
Vice-Chairwoman (InterDigital), "Report from LTE and NR User Plane Break-Out Session", 3GPP TSG-RAN WG2, Meeting #99, R2-1709663, Berlin, Germany, Aug. 21-25, 2017, 60 pages, XP051330342.

* cited by examiner a)

b)

a)

b)

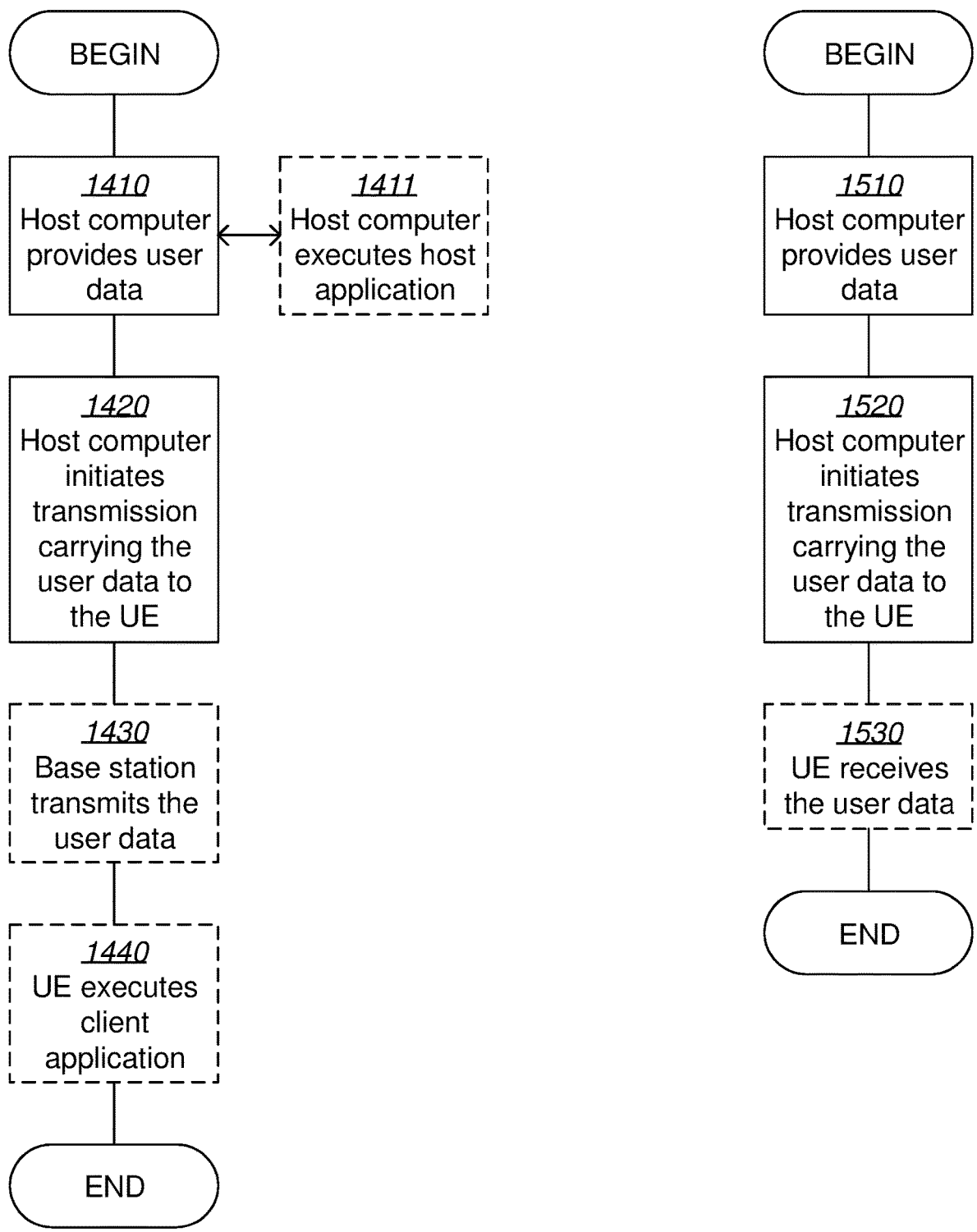

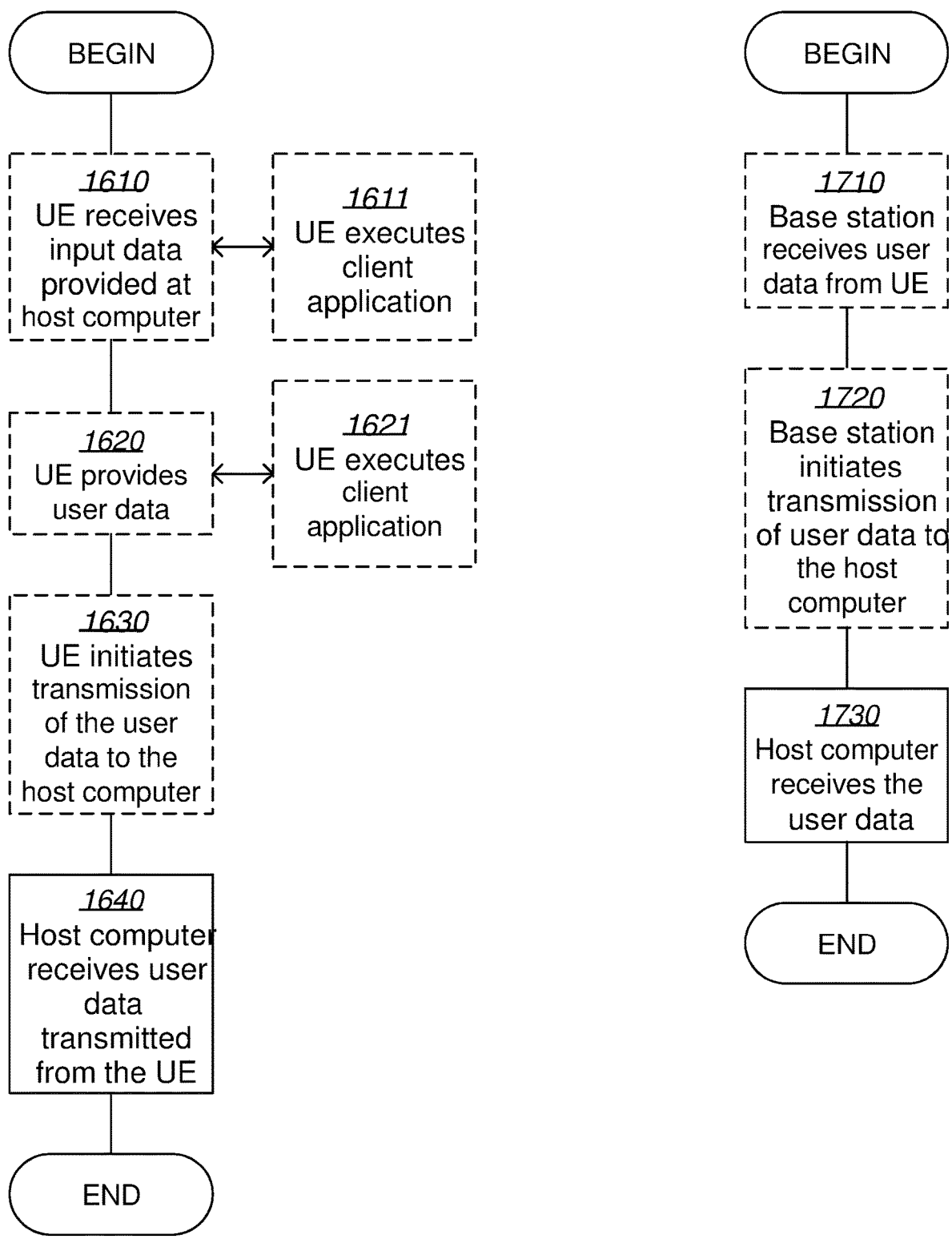

WIRELESS DEVICE, SECOND NODE, AND METHODS PERFORMED THEREBY FOR HANDLING A FAILURE IN A SECONDARY CELL SERVING THE WIRELESS DEVICE

CROSS REFERENCE TO RELATED APPLICATIONS

This application is a 35 U.S.C. § 371 national stage application of PCT International Application No. PCT/SE2018/050984 filed on Sep. 27, 2018, which in turns claims domestic priority to U.S. Provisional Patent Application No. 62/564,549, filed on Sep. 28, 2017, the disclosures and content of which are incorporated by reference herein in their entirety.

TECHNICAL FIELD

The present disclosure relates generally to a wireless device and methods performed thereby for handling a failure in a secondary cell serving the wireless device. The present disclosure also relates generally to a second node and methods performed thereby for handling the failure in the secondary cell serving the wireless device.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., evolved Node B ("eNB"), "eNodeB", "NodeB", "B node", gNB, Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc. . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

Dual Connectivity in LTE

Evolved Universal Terrestrial Radio Access Network (E-UTRAN) may support Dual Connectivity (DC) operation, whereby a multiple Rx/Tx UE in RRC_CONNECTED may be configured to utilize radio resources provided by two distinct schedulers, located in two eNBs connected via a non-ideal backhaul over the X2 interface (see 3GPP 36.300). DC operation may be understood to advantageously provide data aggregation by using more than one link, as well as link diversity for robustness. eNBs involved in DC for a certain UE may assume two different roles: an eNB may either act as a Master node (MN) or as a Secondary node (SN). In DC, an MN may be understood, for example, as a radio network node which may terminate at least an interface between the radio network node and a Mobility Management Entity (MME). Such an interface may be, for example, an S1 control plane interface between an eNB and an MME (S1-MME). In DC, an SN may be understood as a radio network node that may be providing additional radio resources for a UE, but is not the MN. In DC, a UE may be connected to one MN and one SN.

FIG. 1 is a schematic diagram illustrating an exemplary architecture of an LTE DC User Plane (UP), depicting an MN 11, an SN 12 and an X2 interface 13. In LTE DC, the radio protocol architecture that a particular bearer may use may depend on how the bearer may be setup. Three bearer types may exist: Master Cell Group (MCG) bearer 14, Secondary Cell Group (SCG) bearer 15 and split bearers 16. Radio Resource Control (RRC) may be located in the MN, and Signaling Radio Bearers (SRBs) may be always configured as a MCG bearer type, and therefore only use the radio resources of the MN. FIG. 1 depicts how each of the MCG bearer 14 and SCG bearer 15 has a respective Packet Data Convergence Protocol (PDCP) entity 17 and Radio Link Control (RLC) entity 18, each connected to a respective Medium Access Control (MAC) 19 entity in each of the MN and SN. The split bearer 16 has a PDCP entity in the MN 11, and is connected to each of the MAC entities 19 in the MN 11 and the SN 12, via, respectively, an RLC entity located in each of the MN 11 and the SN 12.

LTE-NR Dual Connectivity

LTE-New Radio (NR) DC, which may be also referred to as LTE-NR tight interworking, is currently being discussed for Release 15 (rel-15). In this context, the major changes from LTE DC may be understood to be: the introduction of a split bearer from the SN, known as SCG split bearer, the introduction of a split bearer for RRC, and the introduction of a direct RRC from the SN, also referred to as SCG SRB. Split RRC messages may be mainly used for creating diversity, and the sender may decide to either choose one of the links for scheduling the RRC messages, or it may duplicate the message over both links. In the downlink, the path switching between the MCG or SCG legs, or duplication on both, may be left to network implementation. On the other hand, for the UL, the network may configure a UE to use the MCG, SCG or both legs. The terms "leg" and "path" are used interchangeably throughout this document.

The SN may sometimes be referred to as Secondary gNB (SgNB), where gNB is an NR base station, and the MN as Master eNB (MeNB), in case the LTE is the master node and NR is the secondary node. In the other case, where an NR gNB is the master, and an LTE eNB is the secondary node, the corresponding terms may be SeNB and MgNB.

The following terminologies are used throughout this text to differentiate different dual connectivity scenarios:
  a) DC refers to LTE DC, that is, where both MN and SN employ LTE;
  b) EN-DC refers to LTE-NR dual connectivity, where LTE is the master and NR is the secondary;
  c) NE-DC refers to LTE-NR dual connectivity, where NR is the master and LTE is the secondary;
  d) NR-DC, or NR-NR DC refers to both MN and SN employ NR, and
  e) multi-RAT DC, (MR-DC) is a generic term that may be used to describe where the MN and SN employ different RATs. For example, EN-DC and NE-DC are two different example cases of MR-DC.

FIG. 2 is a schematic diagram illustrating the UP architectures for LTE-NR tight interworking in the MN 21 and the SN 22. An SCG split bearer 23 is present in the SN 22, in addition to the split bearer in the MN 21, which is referred to as an MCG split bearer 24.

FIG. 3 is a schematic diagram illustrating the Control Plane (CP) architecture for LTE-NR tight interworking. An MN 31 operating on LTE, an SN 32 operating on NR, and a UE 33 supporting operation on LTE and NR are illustrated in the Figure, each with its respective protocol stack: RRC 34, PDCP 35, RLC 36, MAC 37 and the Physical layer (PHY) 38. Different signaling radio bearers may be used for carrying RRC messages. SRB0 39, SRB1 40 and SRB2 41, refer to the signaling radio bearers that may be used for carrying RRC messages. An RRC configuration may be sent directly by a configuring node via a direct SRB 42. RRC configurations may be encapsulated in another node's RRC message via Embedded RRC 43.

Carrier Aggregation

When Carrier Aggregation (CA) is configured, the UE may only have one RRC connection with the network. Further, at RRC connection establishment/re-establishment/handover, one serving cell may provide the Non Access Stratum (NAS) mobility information, and at RRC connection re-establishment/handover, one serving cell may provide the security input. This cell may be referred to as the Primary Cell (PCell). In addition, depending on UE capabilities, Secondary Cells (SCells) may be configured to form, together with the PCell, a set of serving cells. The configured set of serving cells for a UE may therefore always consist of one PCell and one or more SCells. Further, when dual connectivity is configured, it may be the case that one carrier under the SCG is used as the Primary SCell (PSCell). Hence, in this case there may be one PCell and one or more SCell(s) over the MCG and one PSCell and one or more SCell(s) over the SCG.

The reconfiguration, addition and removal of SCells may be performed by RRC. At intra-RAT handover, RRC may also add, remove, or reconfigure SCells for usage with the target PCell. When adding a new SCell, dedicated RRC signaling may be used for sending all required system information of the SCell, that is, while in connected mode, UEs may not need to acquire broadcasted system information directly from the SCells.

Radio Link Failure

In LTE, a UE may consider a Radio Link Failure (RLF) to be detected when: i) upon detecting a certain number of out of synchronization, out of sync, indications from the lower layers associated with the Primary Cell (PCell) within a given time, or ii) upon a random access problem indication from MAC, or iii) upon indication from RLC that the maximum number of retransmissions has been reached for an SRB or for a DRB.

When RLF is detected, the UE may prepare an RLF report, which may include, among other information, the measurement status of the serving and neighbor cells at the moment when the RLF was detected. The UE may then go to IDLE mode, select a cell following IDLE mode cell selection procedure, which may be understood to mean that the selected cell may be the same serving node/cell or another node/cell, and start the RRC re-establishment procedure, with a cause value set to RLF-cause.

In the case of LTE DC, the RLF detection procedure is similar to what was described above, except that, only the PCell of the MN is concerned for (i), the MAC in (ii) may be considered to be the MCG MAC entity, the RLC in (iii) may be considered to be the MCG RLC, and the DRB in (iii) may be considered to correspond to MCG and MCG-split DRBs.

On the other hand, failure on the secondary side, which may be known as an SCGFailure, may be detected by:
  a) upon detecting radio link failure for the SCG, in accordance with (i), (ii) and (iii) above, replacing PCell for PSCell, MCG MAC for SCG MAC, and MCG/MCG-Split DRB for SCG DRB, or
  b) upon SCG change failure, that is, upon not being able to finalize an SCG change within a certain duration after the reception of an RRC connection reconfiguration message instructing the UE to do so, or
  c) upon stopping uplink transmission towards the PSCell due to exceeding the maximum uplink transmission timing difference when powerControlMode is configured to 1.

Upon detecting SCGFailure, the UE may send an SCGFailureInformation message towards the MN, which may also include measurement reports, and the MN may either release the SN, change the SN and/or the Cell, or reconfigure the SCG. Thus, a failure on the SCG may be understood to not lead to a re-establishment to be performed on the MCG.

3GPP has agreed to adopt the same principles in the context of LTE-NR interworking, that is, re-establishment in the case of RLF on the master leg and recovery via SCGFailureInformation and SN release/change/modification in case of RLF on the secondary leg. Specifically, it has been agreed that upon SgNB failures, a UE may need to:
  Suspend all SCG DRBs and suspend SCG transmission for MCG split DRBs, and SCG split DRBs;
  Suspend direct SCG SRB and SCG transmission for MCG split SRB;
  Reset SCG-MAC; and
  Send the SCGFailureInformation message to the MeNB with corresponding cause values.

Duplication in NR and EN-DC

It has been agreed to introduce duplication of packets for the sake of enhancing reliability. In duplication, duplicated packets, e.g., PDCP PDUs, may be sent over different paths, e.g., carriers. Duplication may be applied at either the DC level or CA level. DC level duplication may be applicable only to split bearers where the same PDCP packet is forwarded to both the MCG and SCG RLC entities that may be mapped to the split bearer. On the other hand, CA level duplication may be applicable only to non-split bearers, SCG bearers in the case of EN-DC, or MCG bearers in the case of NE-DC or NR-NR DC, and two RLC entities may be mapped to the same PDCP entity, that is, two SCG RLC entities may be mapped to a certain SCG bearer in the case of EN-DC, or two MCG RLC entities may be mapped to the same MCG bearer in the case of NE-DC or NR-NR DC. With CA level duplication, logical channel (carrier) restriction may be made, so that one RLC entity may be mapped only to one of the carriers comprising the CA tuple, so diversity may be ensured. That is, the original and the duplicate may not be sent over the same carrier.

In spite of the advances in signaling schemes in newer systems, radio link failures can hinder the increased efficiency of the communications. Additionally, existing methods to handle radio link failures may result in a signaling overhead and a service interruption time that is unnecessary, which may in turn result in increased latency, and decreased capacity in a wireless network, as well as battery drainage in the in devices involved. This problem becomes more pronounced as signaling architectures in communications networks become increasingly complex.

SUMMARY

It is an object of embodiments herein to improve the handling of failures in a wireless communications network. It is a particular object of embodiments herein to improve the handling of failures in a wireless communications network using carrier aggregation.

According to a first aspect of embodiments herein, the object is achieved by a method, performed by a wireless device. The method is for handling a failure in a secondary cell serving the wireless device. The first node and the second node operate in a wireless communications network. The secondary cell and a primary cell serve the wireless device with CA in a wireless communications network. The wireless device determines the failure in the secondary cell. The determination is based on a determination of a radio link control failure. The wireless device then initiates sending an indication to a network node. The network node is one of a first network node and a second network node. The indication is based on the determined failure of the secondary cell.

According to a second aspect of embodiments herein, the object is achieved by a method, performed by the network node. The method is for handling the failure in the secondary cell. The network node is one of a first network node and a second network node. The secondary cell and a primary cell serve the wireless device with CA in the wireless communications network. The network node receives the indication from the wireless device. The indication is based on the determined failure of the secondary cell. The determination of the failure in the secondary cell is based on the determination of the radio link control failure. The network node then initiates a second procedure based on the received indication. The second procedure comprises releasing of the secondary cell.

According to a third aspect of embodiments herein, the object is achieved by a wireless device configured to handle a failure in a secondary cell configured to serve the wireless device. The secondary cell and a primary cell are configured to serve the wireless device with CA in a wireless communications network. The wireless device is further configured to determine the failure in the secondary cell. The determination is configured to be based on a determination of a radio link control failure. The wireless device is also configured to initiate sending an indication to a network node. The network node is configured to be one of a first network node and a second network node. The indication is configured to be based on the failure of the secondary cell configured to be determined.

According to a fourth aspect of embodiments herein, the object is achieved by the network node, configured to handle the failure in the secondary cell. The network node is configured to be one of the first network node and the second network node. The secondary cell and the primary cell are configured to serve the wireless device with CA in the wireless communications network. The network node is further configured to receive the indication from the wireless device. The indication is configured to be based on the failure of the secondary cell configured to be determined. The determination of the failure in the secondary cell may be configured to be based on the determination of the radio link control failure. The network node is also configured to initiate the second procedure based on the received indication. The second procedure is configured to comprise releasing of the secondary cell.

By the wireless device determining the determining the failure in the secondary cell, the wireless device is enabled to specifically detect that the failure has occurred in the secondary cell. The wireless device is therefore enabled to refrain from performing an RRC re-establishment and setting up the whole radio connection with the network node from scratch, which may cause a considerable service interruption time. Instead, the wireless device is enabled to specifically act on the failed secondary cell, e.g., by deactivating it or by suspending it. By the wireless device then initiating sending the indication, the wireless device may enable the second network node that may receive the indication, to know that the failure has occurred, and to take appropriate action, as will be described later, in relation specifically, to the failed secondary cell, e.g., by releasing it. Embodiments herein may therefore be understood to relate to providing mechanisms to avoid unnecessary re-establishment or reconfigurations, and the unnecessary signaling overhead and service interruption that may occur due to that, when an RLF has been detected.

BRIEF DESCRIPTION OF THE DRAWINGS

Examples of embodiments herein are described in more detail with reference to the accompanying drawings, according to the following description.

FIG. 14 is a flowchart depicting embodiments of a method in a communications system including a host computer, a base station and a user equipment, according to embodiments herein.

FIG. 15 is a flowchart depicting embodiments of a method in a communications system including a host computer, a base station and a user equipment, according to embodiments herein.

FIG. 16 is a flowchart depicting embodiments of a method in a communications system including a host computer, a base station and a user equipment, according to embodiments herein.

FIG. 17 is a flowchart depicting embodiments of a method in a communications system including a host computer, a base station and a user equipment, according to embodiments herein.

DETAILED DESCRIPTION

Figure 1:
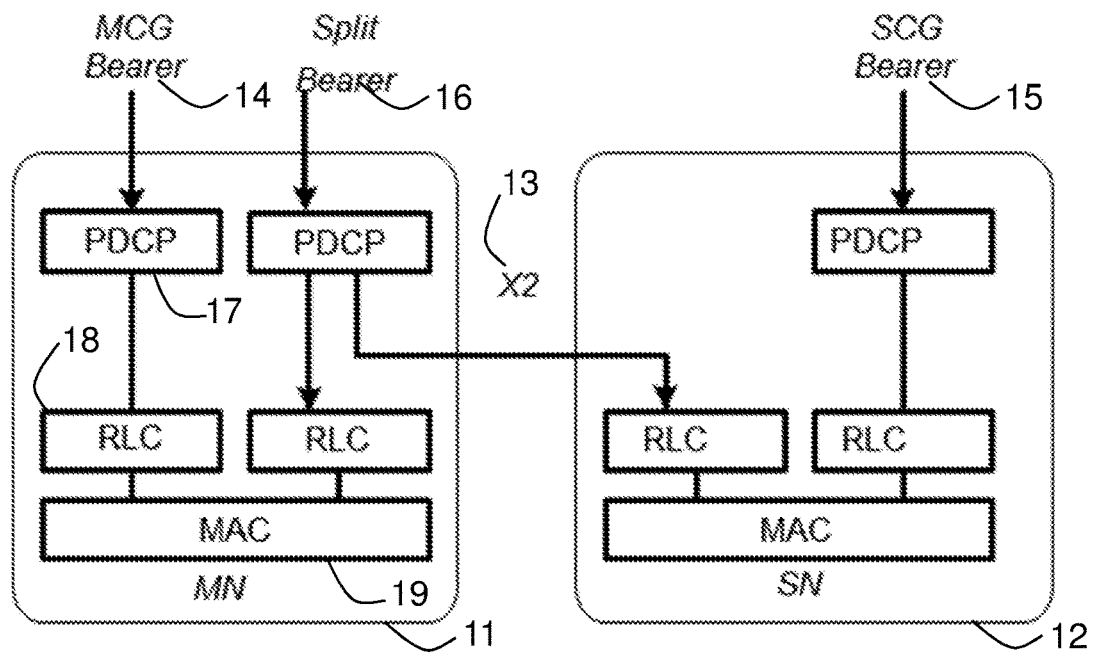
FIG. 1 is a schematic diagram illustrating an exemplary architecture of an LTE DC User Plane (UP).
Figure 2:
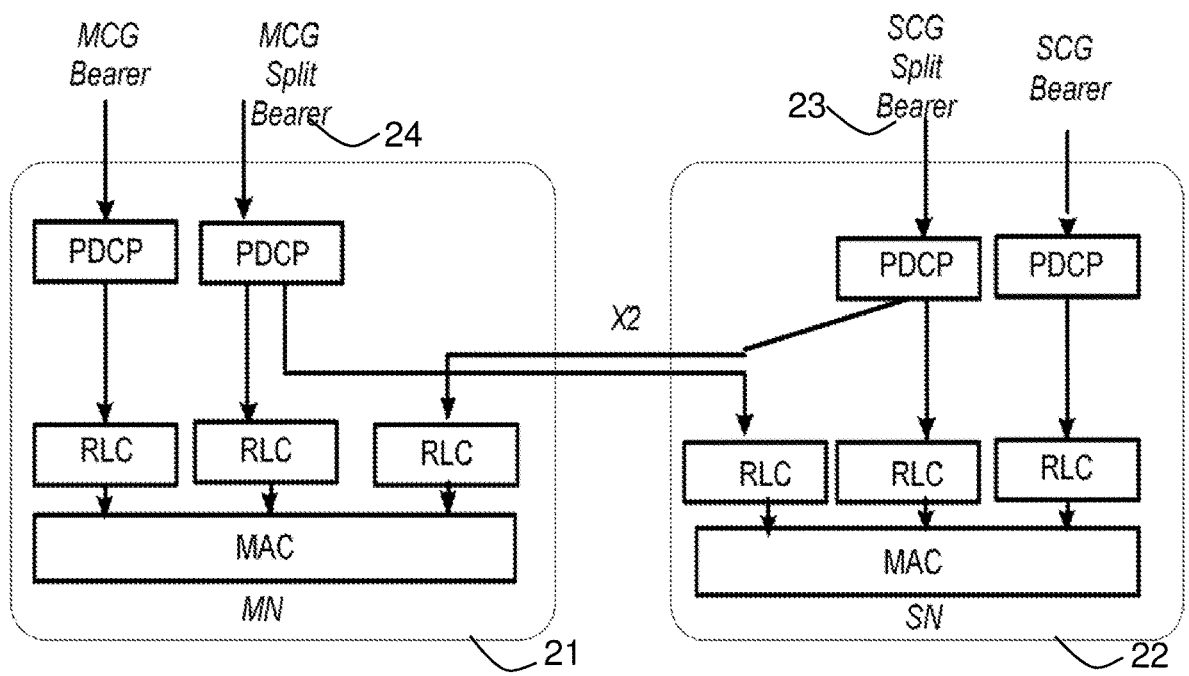
FIG. 2 is a schematic diagram illustrating the UP architectures for LTE-NR tight interworking.
Figure 3:
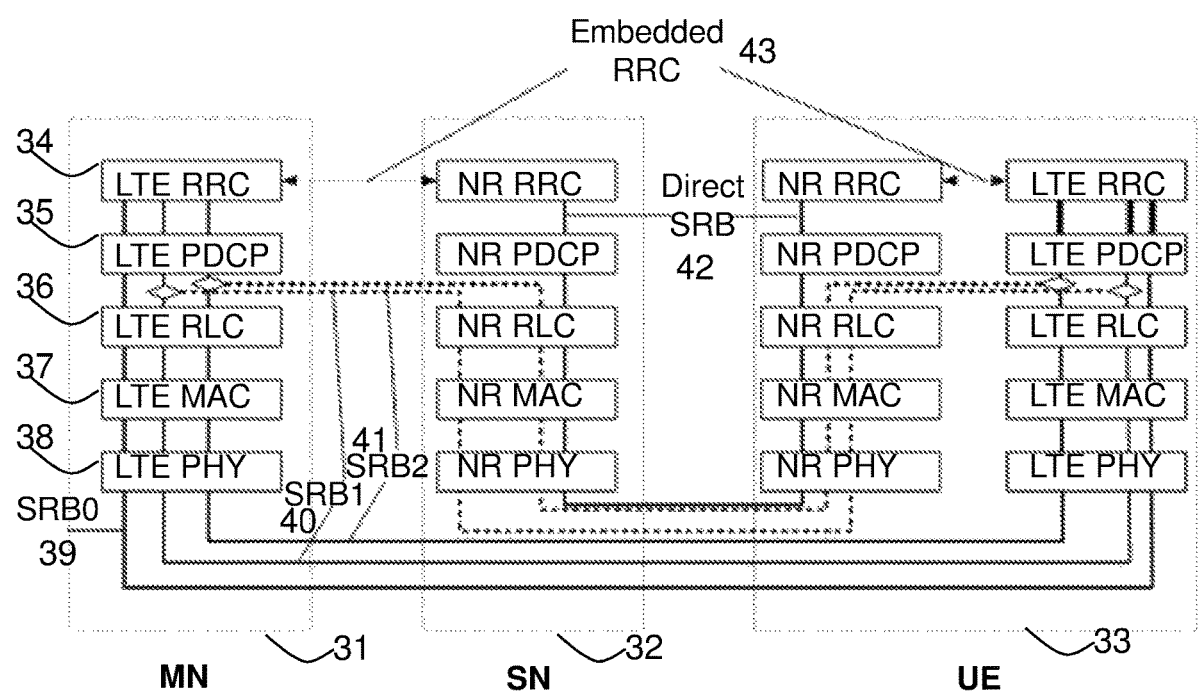
FIG. 3 is a schematic diagram illustrating the Control Plane (CP) architecture for LTE-NR tight interworking.

As part of developing embodiments herein, certain challenge(s) that currently exist and may be associated with use of at least some of the existing methods, and that may addressed by embodiments herein, will first be identified and discussed.

In LTE CA without carrier restriction, the data from any RLC entity may be mapped to any of the serving cells, PCell or SCell. Thus, retransmissions of a certain RLC PDU may be sent via different carriers. For example, a first transmission may be sent via a PCell, a first retransmission may be sent via a SCell1, a second retransmission may be sent via a PCell, a third retransmission may be sent via SCell2, etc. . . . . As the UE may be understood to not be required to keep track of this, when the maximum number of RLC retransmissions is reached, it is not possible to determine whether the PCell or a particular SCell is causing this problem. Thus, the UE is required to trigger RLF. If it is considered that in LTE, the frequencies and/or spectrum available is limited, that is, from 800 MHz to around 3 GHz, experiencing bad radio link conditions to one carrier most likely will reflect the same situation on the other ones. So the differentiation of which carrier is experiencing bad radio conditions may not be that relevant.

If the UE was operating in DC, e.g., LTE DC, NR-NR DC, EN-DC, NE-DC, and this is occurring on the SN side, reaching the maximum number of retransmission on an SCG RLC may be understood to trigger SCGFailure, while occurrence of this on the MN side may be understood to trigger RLF.

In NR, when CA level duplication is enabled, there is a logical channel restriction. That is, a certain duplicated RLC entity may be understood to be mapped to a particular carrier. Thus, when the maximum number of RLC retransmissions is reached, it may be possible to identify the carrier that was being used for the concerned RLC. Thus, it has been proposed in RAN2 that instead of reporting RLF, or SCG Failure if the duplication may have been happening on an SCG bearer in EN-DC, the UE may report an SCell-RLF indication to the gNB, or SgNB in the case of EN-DC. The main advantage of this is that if the PCell, or PSCell in case of EN-DC, carrier is functioning well, there may be no need to do re-establishment, or SN change or SCG reconfiguration in case of EN-DC.

This may be considered to be especially relevant for NR due to the wide range of frequencies that may be used, spanning from 100s of MHz up to 100 GHz, thus resulting in a wide range of different channel behavior under the same network conditions. Therefore, in case of CA level duplication on NR, a UE may use different frequencies in the carriers being used for duplication that may be quite far to each other when considering the overall radio spectrum. Hence, having a bad radio link on one of them may be understood to not necessarily indicate that the channel quality is also bad on the other carrier. For example, this may apply to one carrier using around 1 GHz frequency and another using 60 GHz.

Thus, triggering RLF or SCG failure, and the subsequent re-establishment or SCG change/reconfiguration, may result in a signaling overhead and a service interruption time that is unnecessary.

In such a situation, indeed, it may be enough to remove and/or deactivate the SCell where RLF conditions may have been detected, and let the UE to continue the transmissions on the other (P)SCell where the channel conditions may be good.

Certain aspects of the present disclosure and their embodiments may provide solutions to these or other challenges. Embodiments herein may be understood to relate to handling of secondary cell failure. Embodiments herein may be understood to relate to providing mechanisms to avoid unnecessary re-establishment or reconfigurations, and the unnecessary signaling overhead and service interruption that may occur due to that, when an SCell RLF has been detected.

In embodiments herein, a method is proposed to prevent RLF or SCG failure triggering in case the detected problem may be affecting only one of the SCells and not the PCell, in the case of standalone NR operating in CA, or the PSCell, in the case of LTE-NR interworking or NR-NR DC.

There are, proposed herein, various embodiments which address one or more of the issues disclosed herein.

Several embodiments and examples are comprised herein. It should be noted that the embodiments and/or examples herein are not mutually exclusive. Components from one embodiment or example may be tacitly assumed to be present in another embodiment or example and it will be obvious to a person skilled in the art how those components may be used in the other exemplary embodiments and/or examples.

Figure 4:
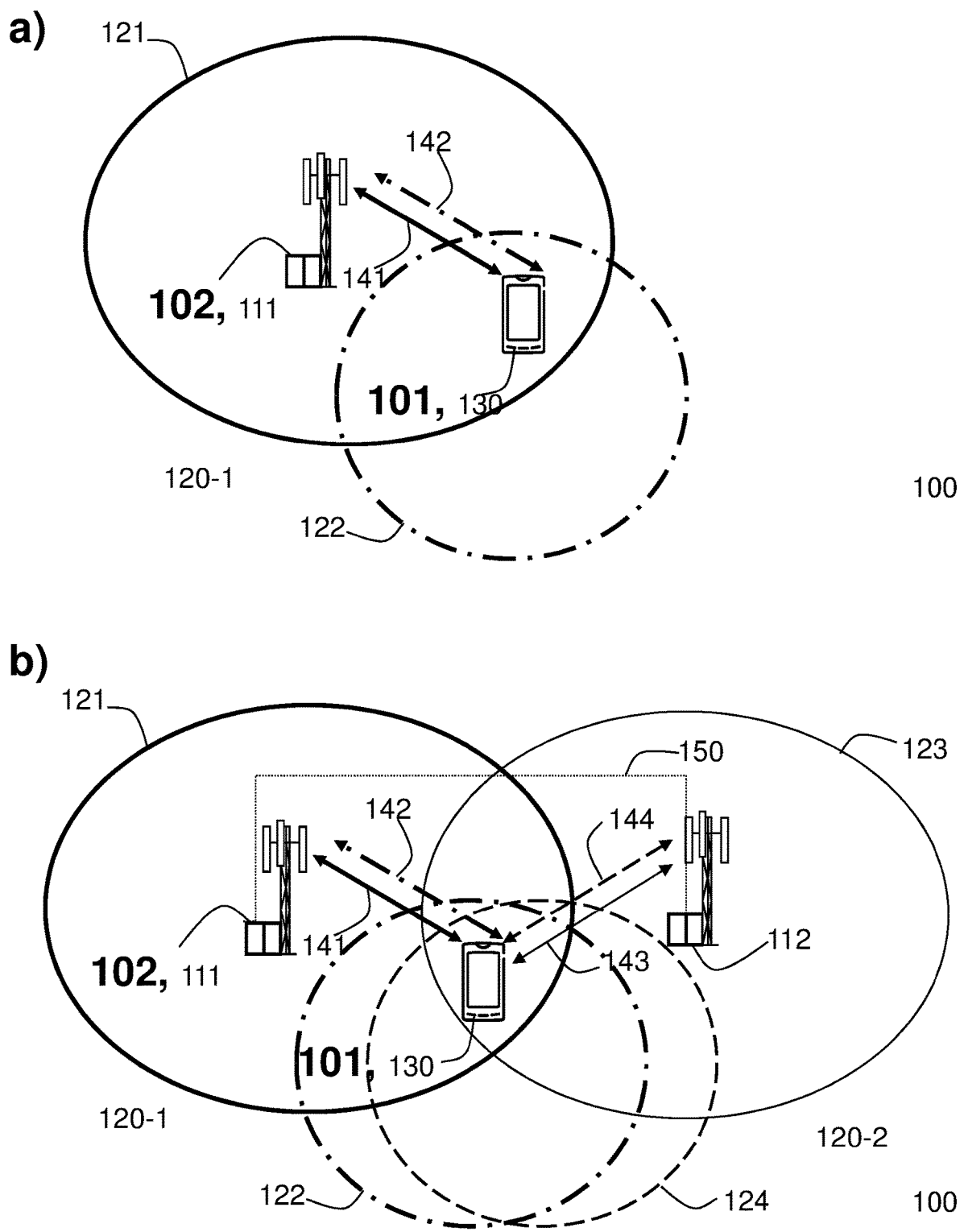
FIG. 4 is a schematic diagram illustrating three non-limiting examples, in panels a), b) and c), respectively, of embodiments of a wireless communications network, according to embodiments herein.
Figure 4:
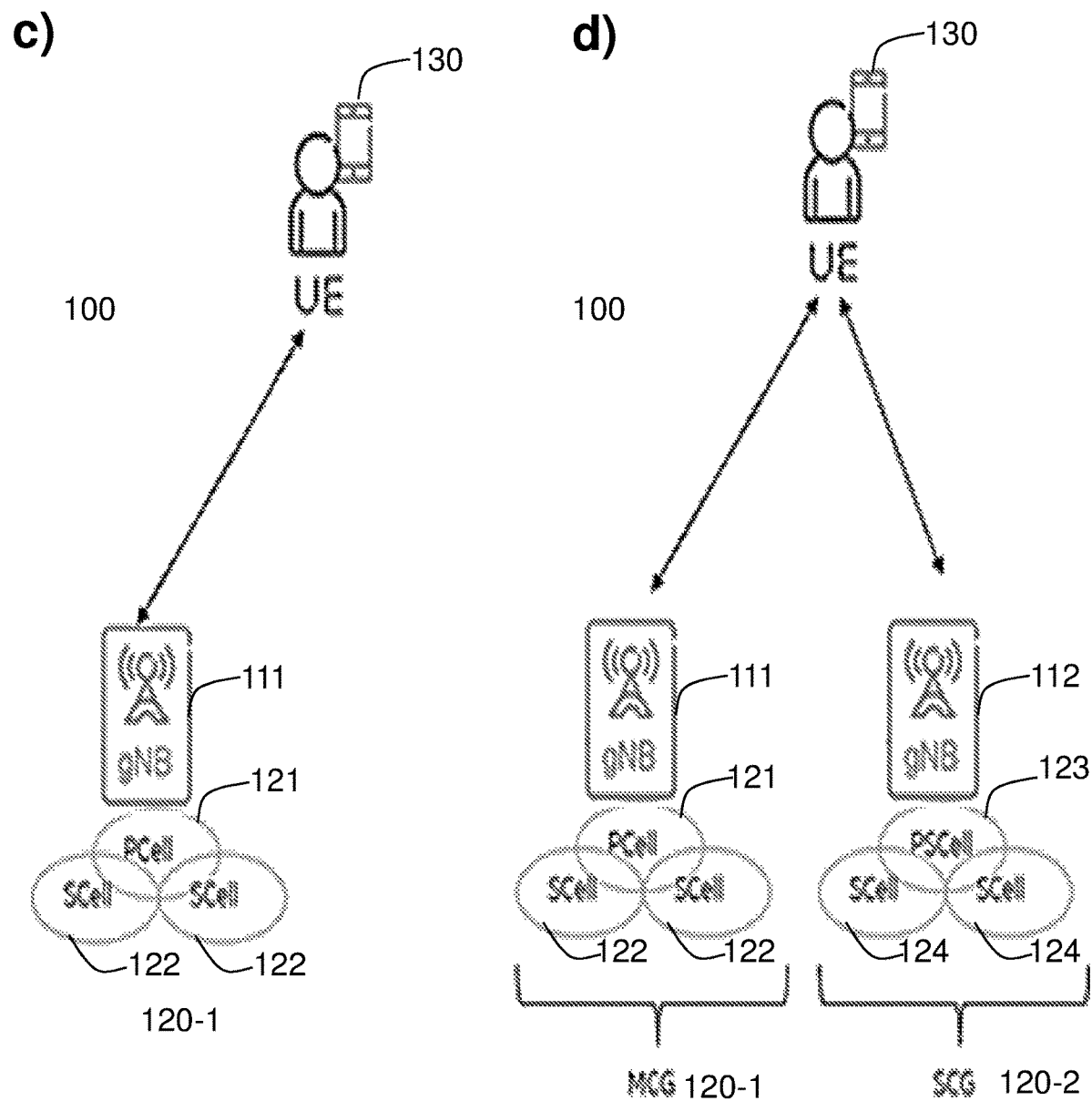

FIG. 4 depicts three non-limiting examples, in FIGS. 4a, 4b, 4c and 4d, respectively, of a wireless communications network 100, sometimes also referred to as a wireless communications system, cellular radio system, or cellular network, in which embodiments herein may be implemented. The wireless communications network 100 may typically be a 5G system, 5G network, or Next Gen System or network. The wireless communications network 100 may also support other technologies such as, for example, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, WCDMA, Universal Terrestrial Radio Access (UTRA) TDD, GSM network, GERAN network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system. The wireless communications network may also be understood as a non-cellular system, comprising network nodes which may serve receiving nodes, such as wireless devices, with serving beams. This may be a typical case, e.g., a in a 5G network.

The wireless communications network 100 comprises a plurality of nodes, whereof a first node 101 and a second node 102 are depicted in the non-limiting examples of FIG. 4. In embodiments herein, the first node 101 is a wireless device, as the wireless device 130 described below. In embodiments herein, the second node 102 is a network node, such as any of the first network node 111 and the second network node 112 described below. In some examples, the first node 101 may be wireless device 130, and the second node 102 may be one of the first network node 111, or the second network node 112. To facilitate the reference to the second node 102 being any of the first network node 111 and the second network node 112, the second node 102 will be referred to herein as the network node 102.

The wireless communications network 100 comprises a plurality of network nodes, whereof a first network node 111 and a second network node 112 are depicted in the non-limiting examples of FIG. 4. In other examples, which are not depicted in FIG. 4, any of the first network node 111 and the second network node 112 may be a distributed node, such as a virtual node in the cloud, and may perform its functions entirely on the cloud, or partially, in collaboration with a radio network node.

Any of the first network node 111 and the second network node 112 may be a radio network node. That is, a transmission point such as a radio base station, for example a gNB, an eNB, or any other network node with similar features capable of serving a wireless device, such as a user equipment or a machine type communication device, in the wireless communications network 100.

The wireless communications network 100 covers a geographical area which may be divided into cell areas, wherein each cell area may be served by a network node, although, one radio network node may serve one or several cells. The wireless communications network 100 may comprise at least one of: a first group of cells 120-1 and a second group of cells 120-2. The first group of cells 120-1 may be, for example, a MCG. The second group of cells 120-2 may be, for example, a SCG. The first group of cells 120-1 may comprise a first cell 121, and one or more second cells 122. In the non-limiting examples depicted in panels a) and b) of FIG. 4, only one second cell 122 is depicted to simplify the Figure. However, it will be understood that more second cells may be comprised in the one or more second cells 122. The first cell 121 maybe a primary cell (PCell) and each of the one or more second cells 122 may be a secondary cell (SCell). In the non-limiting example depicted in FIG. 4, the first network node 111 is a radio network node that serves the first cell 121, and the one or more second cells 122. Even in examples wherein the wireless communications network 100 may not be referred to as a cellular system, the first network node 111 may serve receiving nodes, such as wireless devices, with serving beams, the areas of coverage of the beams may still be referred to as cells.

The second group of cells 120-2 may comprise a third cell 123, and one or more fourth cells 124. In the non-limiting examples depicted in panels a) and b) of FIG. 4, only one fourth cell 124 is depicted to simplify the Figure. However, it will be understood that more fourth cells may be comprised in the one or more fourth cells 124. The third cell 123 maybe a primary secondary cell (PSCell) and each of the one or more fourth cells 124 may be a secondary cell (SCell). In the non-limiting example depicted in FIG. 4, the second network node 112 is a radio network node that serves the third cell 123, and the one or more second cells 124. Even in examples wherein the wireless communications network 100 may not be referred to as a cellular system, the second network node 112 may serve receiving nodes, such as wireless devices, with serving beams, the areas of coverage of the beams may still be referred to as cells.

The first network node 111, in some examples, may be a MN.

The second network node 112, in some examples, may be a SN.

Since any of the one or more second cells 122 or the one or more fourth cells 124 may be a secondary cell, the wireless communications network 100 may be understood to comprise a secondary cell 122, 123, 124.

Panels c) and d) of FIG. 4 depict, respectively, a further particular example of the wireless communications network 100 as depicted, respectively, in panel a) and panel b). In the non-limiting example of the wireless communications network 100 depicted in panel c), the first group of cells 120-1 comprises the first cell 121, which is a PCell, two second cells 122, each of which being a SCell. The first network node 111 is a gNB serving the wireless device 130, which is a UE, with the first cell 121, and the two second cells 122. In the non-limiting example of the wireless communications network 100 depicted in panel d), the first network node 111 is a gNB serving the wireless device 130, which is a UE, with the first group of cells 120-1 is a MCG comprising the first cell 121, which is a PCell, and two second cells 122, each of which being a SCell. Also in the non-limiting example of the wireless communications network 100 depicted in panel d), the wireless communications network 100 further comprises the second network node 112. The second network node 112, in this example, is a gNB serving the wireless device 130, with the second group of cells 120-2, which is a SCG comprising the third cell 123, which is a PSCell, and two fourth cells 124, each of which being a SCell.

In other examples, the first network node 111 may be an eNB as MN, and the second network node 112 may be a gNB as SN. It may be noted that although the description of embodiments herein may focus on the LTE-NR tight interworking case, where the LTE is the master node, embodiments herein may be understood to also be applicable to other DC cases, such as LTE-NR DC, where NR is the master and LTE is the secondary node (NE-DC), NR-NR DC, where both the master and secondary nodes are NR nodes, or even between LTE/NR and other RATs.

Any of the first network node 111 and the second network node 112 may be of different classes, such as, e.g., macro base station, home base station or pico base station, based on transmission power and thereby also cell size. Any of the first network node 111 and the second network node 112 may support one or several communication technologies, and its name may depend on the technology and terminology used. In 5G/NR, any of the first network node 111 and the second network node 112 may be referred to as a gNB and may be directly connected to one or more core networks, which are not depicted in FIG. 4. In LTE, any of the first network node 111 and the second network node 112 may be referred to as an eNB.

A plurality of wireless devices are located in the wireless communication network 100, whereof a wireless device 130, is depicted in the non-limiting examples of FIG. 4. The wireless device 130 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the wireless devices comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may comprised within the wireless communications network 100.

The wireless device 130 may be configured to communicate within the wireless communications network 100 with the first network node 111 in the first cell 121 over a first link 141, e.g., a radio link. The wireless device 130 may be configured to communicate within the wireless communications network 100 with the first network node 111 in each of the one or more second cells 122 over a respective second link 142, e.g., a radio link. The wireless device 130 may be configured to communicate within the wireless communications network 100 with the second network node 112 in the third cell 123 over a third link 143, e.g., a radio link. The wireless device 130 may be configured to communicate within the wireless communications network 100 with the second network node 112 in each of the one or more fourth cells 124 over a respective fourth link 144, e.g., a radio link.

The first network node 111 and the second network node 112 may be configured to communicate within the wireless communications network 100 over a fifth link 150, e.g., a wired link or an X2 interface.

In general, the usage of "first", "second", "third", "fourth", etc. ... herein may be understood to be an arbitrary way to denote different elements or entities, and may be understood to not confer a cumulative or chronological character to the nouns they modify.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

More specifically, the following are: a) embodiments related to a first node, which may be also referred to as a detecting node, such as the wireless device 130, e.g., a 5G UE; and b) embodiments related to a second node, which may also be referred to as a receiving node, which is a network node 102, such as the first network node 111, the second network node 112, or the wireless device 130. The first node 101 may be different than the first node 102, although in some examples, they may be co-located, e.g., when they are respectively the first network node 111 and the second network node 112.

Embodiments of a method, performed by the wireless device 130, will now be described with reference to the flowchart depicted in FIG. 5. The method is for handling a failure in a secondary cell 122, 123, 124 serving the wireless device 130. The secondary cell 122, 123, 124 and a primary cell 121 serve the wireless device 130 with Carrier Aggregation (CA) in the wireless communication network 100.

In some embodiments all the actions may be performed. In some embodiments, one or more actions may be performed, that is one or more actions may be optional. In FIG. 5, an optional action is indicated with dashed lines. It should be noted that the examples herein are not mutually exclusive. Several embodiments are comprised herein. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description.

Action 501

During the course of operations in the wireless communications network 100, failures may occur.

In this Action 501, the wireless device 130 determines the failure in the secondary cell 122, 123, 124. The determination is based on a determination of a radio link control failure.

Determining may be understood as, e.g., detecting. The detecting may be implemented, for example, via the second link 142, and/or the fourth link 144.

That the wireless device 130 determines the failure in the secondary cell 122, 123, 124, may be understood to comprise that after the failure may be detected, the wireless device 130 may check the type of cell where the failure has occurred. That is, the wireless device 130 may have determined whether the failure has occurred in the primary cell 121 or in a secondary cell 122, 123, 124, and it may have concluded that the failure occurred in the secondary cell 122, 123, 124. The wireless device 130 may be understood to be enabled to determine that the failure has occurred in the secondary cell 122, 123, 124 because with CA, a certain RLC entity, e.g., duplicated RLC entity may be understood to be mapped to a particular carrier.

The determining in this Action 501 may be based on one or more criteria. For example, the one or more criteria may be if a maximum number of retransmissions, e.g., radio link control retransmissions, may have been reached.

The one or more criteria may be based on at least one of: a) whether or not duplication is configured and/or applied; and b) whether or not Dual Connectivity (DC) is applied.

In a first example, the wireless device 130 may be a UE, where CA level duplication is being employed, and the maximum number of RLC retransmissions may be reached on one of the carriers mapped to the duplicated bearer.

In a second example, the wireless device 130 may be a UE employing CA, which may keep track of the association of the RLC entity and the carrier to which the RLC packets from that entity are being sent to, and it may also count the number of failures that resulted from using that carrier.

In a third example, being a particular example of the second example, the failure count of the carrier may be per RLC packet. That is, several failure counters may be initiated whenever an RLC packet may be sent over a given carrier, and incremented each time there is a failure. If the RLC packet is successfully sent, the failure count for that counter associated with the carrier and the concerned RLC packet may be removed.

The determination of a radio link control failure may be understood as a threshold for sending an indication, e.g., a report, on the failure.

In a fourth example, being a particular example of the third example provided above, if the maximum number of failures is reached, a value which may be understood to be able to be configured by any of the first network node 111 or the second network node 112 or by the wireless device 130, for any of the failure counters, the wireless device 130 may consider the threshold for reporting SCellFailureReport is reached.

In a fifth example, being another particular example of the third example provided above, if the sum of all the active failure counters reaches a certain value, a value which may be understood to be able to be configured by any of the first network node 111 or the second network node 112 or the wireless device 130, the wireless device 130 may consider the threshold for reporting SCellFailureReport is reached.

In a sixth example, being a particular example of the second example provided above, the failure count of the carrier is per carrier, regardless of which RLC packet it may be transmitting. The failure counter may be updated for each failure, within a given time window, which may be understood to be a configurable amount. If a certain number of or percentage of failures, as compared to the successful ones, are reached, also configurable values, within the time window, the wireless device 130 may consider the threshold for reporting SCellFailureReport is reached.

By performing the determining in this Action 501, the wireless device 130 may be enabled to specifically detect that the failure has occurred in the secondary cell 122, 122, 123, and be enabled to refrain from performing an RRC re-establishment and setting up the whole radio from scratch, which may cause a considerable service interruption time. Instead, the wireless device 130 may be enabled to specifically act on the failed secondary cell 122, 122, 123, as described in Action 502, and Action 503.

Action 502

In this Action 502, the wireless device 130 initiates sending an indication to the network node 102. The network node 102 is one of the first network node 111 and the second network node 112. The indication is based on the determined failure of the secondary cell 122, 123, 124.

Initiating may be understood as beginning, enabling or triggering. Initiating sending in this Action 502 may comprise sending, e.g., providing, or transmitting.

The sending may be implemented, for example, via the second link 142, the third link 143 and/or the fourth link 144.

That the indication is based on the determined failure of the secondary cell 122, 123, 124 may be understood to mean that, the indication sent may depend on what type of secondary cell 122, 123, 124, and in what type of group, e.g., MCG, SCG, the failure may have been detected.

The indication may be for example a SCellFailureReport.

In a first example, the wireless device 130 may be a UE employing CA. When detecting the maximum number of RLC retransmissions has been reached, the wireless device 130 may send an SCellFailureReport towards any of the first network node 111 or the second network node 112.

In some embodiments, the indication may comprise information indicating the secondary cell 122, 123, 124 where the radio link control failure has been detected.

In a seventh example, being a particular example of the any of the first-sixth examples provided above, the SCellFailureReport may contain information indicating the SCell where the failure was detected.

The information indicating the secondary cell 122, 123, 124 may be a cell index of the secondary cell 122, 123, 124 or an identity of a failed logical channel that was associated with the secondary cell 122, 123, 124.

In some embodiments, the wireless device 130 may be not operating in DC mode. In some of such embodiments, after determining the failure in the secondary cell 122, the wireless device 130 may send the indication, comprising a failure report, to the first network node 111, the first network node 111 being a serving network node of the wireless device 130.

As an example of such embodiments, in an eighth example being a particular example of the any of the first-seventh examples provided above, the wireless device 130 may be a UE which is not operating in DC mode, and if the wireless device 130 may detect the SCell failure, it may send the failure report to the serving network node 102.

In some embodiments, the wireless device 130 may be operating in DC mode. After detecting the failure in the secondary cell 122, wherein the secondary cell 122 belongs to the first group of cells 120-1, the first group of cells 120-1 being an MCG, the wireless device 130 may send the indication comprising the failure report to the first network node 111, the first network node 111 being a master node and a serving network node of the wireless device 130.

As an example of such embodiments, in a ninth example, being a particular example of the any of the first-seventh examples provided above, the wireless device 130 may be a UE which is operating in DC mode, and if it detects a failure on an SCell belonging to the MCG, it sends the report to the master node.

In some embodiments, the wireless device 130 may be operating in DC mode. After detecting the failure in the secondary cell 124, wherein the secondary cell 124 belongs to the second group of cells 120-2, the second group of cells 120-2 being an SCG, the wireless device 130 may send the indication comprising the failure report to the second network node 112, the second network node 112 being a secondary node and a serving network node of the wireless device 130. In some of such embodiments, the secondary cell 124 may not be a Primary Secondary Cell (PSCell).

As an example of such embodiments, in a tenth example, being a particular example of the any of the first-seventh examples provided above, the wireless device 130 may be a UE operating in DC mode, and if it detects a failure in an SCell belonging to the SCG, it sends the report to the second network node 112. In an eleventh example, being a particular example of the tenth example, the failed SCell is not the PSCell, that is, the third cell 123.

In an twelfth example, being a particular example of the eleventh example, if the wireless device 130 has SCG SRB configured, the failure report may be sent directly to the second network node 112 via the SCG SRB.

In an thirteenth example, being a particular example of the eleventh example, if the wireless device 130 has no SCG SRB configured, the failure report may be sent to the second network node 112 embedded in an MCG SRB.

In yet other embodiments, the wireless device 130 may be operating in DC mode. After detecting the failure in the secondary cell 123, wherein the secondary cell 123 belongs to the second group of cells 120-2, the second group of cells 120-2 being the SCG, the wireless device 130 may send the indication comprising the failure report to the first network node 111, the first network node 111 being a master node and a serving network node of the wireless device 130. In some of such embodiments, the secondary cell 123 may be a PSCell. Particularly, the failure report may be an SCG failure information report.

As an example of such embodiments, in a fourteenth example, being a particular example of the any of the first-seventh examples provided above, the wireless device 130 may be a UE operating in DC mode, and when it detects a failure in an SCell belonging to the SCG, it sends the report to the first network node 111.

In an fifteenth example, being a particular example of the fourteenth example, the failed SCell may not be the PSCell.

In some examples, the SCellFailureReport may be a new RRC message.

In other examples, the SCellFailureReport may be an enhanced SCGFailureInformation report.

The failure report may include the SCell identity.

In other examples, the failure report may include an indication of whether the failed SCell belongs to the MCG or SCG.

It may be understood that, in any of the previous examples, when an additional failure may be detected on the PCell, the wireless device 130 may be able to trigger RLF and radio-establishment.

It may be similarly understood that, in any of the previous examples, when a failure may be detected on the PSCell, that is, the third cell 123, the wireless device 130 may trigger legacy SCGFailureInformation reporting towards the first network node 111.

By initiating sending the indication in this Action 502, the wireless device 130 may enable the second network node 102, that is any of the first network node 111 or the second network node 112 receiving the indication to know that the failure has occurred, and to take appropriate action, as will be described later, in relation to FIG. 6.

Action 503

As explained earlier, when a problem may be detected in one of the secondary cells 122, 123, 124 that the wireless device 130 may be using, adopting legacy LTE behavior in NR may result in RLF, in case of standalone NR, or SCG failure, in case of LTE-NR interworking. However, in NR, the frequency range that may be used may be very wide, from hundreds of MHz up to tens of GHz. As such, a failure due to bad radio quality in one carrier may not necessarily correlate with the other carriers that may be being used by the wireless device 130, either in CA or DC mode. Therefore, it may be beneficial for the wireless device 130 to be able to take measures to stop using only the failed carrier.

According with this, in this Action 503, the wireless device 130 may initiate a first procedure based on the determined failure. The first procedure may be at least one of: i) a suspension of a radio link control entity related to the failed radio link control, or failed secondary cell 122, 124; or b) a deactivation of the duplication via the secondary cell 122, 124 where the radio link control failure has occurred.

To suspend a radio link control entity may be understood as to refrain from trying to schedule data in the radio link control entity.

To deactivate the duplication of the duplication via the secondary cell 122, 124 may be understood as to refrain from pushing data via the secondary cell 122, 124.

For example, in any of the previous examples, after or upon the sending of the SCell failure report according to the previous examples, the wireless device 130 may suspend the RLC entity related to the failed SCell.

In other examples according to the previous examples, if duplication is activated, the wireless device 130 may deactivate the SCell and flush the HARQ entity associated with the failed SCell.

In some of these last examples, after duplication may be de-activated, the logical channel to carrier restriction of the wireless device 130 may kept for the remaining channels, so that data may not be scheduled on the failed SCell. This may be considered an exceptional behavior in the case of SCell failure, since according to current 3GPP agreements, when duplication is deactivated, the remaining RLC channels may need to transmit on all SCells, no restriction applied.

By initiating the first procedure based on the determined failure in this Action 503, the wireless device 130 is enabled to avoid an RRC re-establishment by de-activating only the SCell where the RLF may have been detected. In this way, the wireless device 130 may continue transmitting over the other cells, e.g., (P)Cell, that are not affected by the failure.

Embodiments of a method, performed by the network node 102, will now be described with reference to the flowchart depicted in FIG. 6. The method is for handling the failure in the secondary cell 122, 123, 124. The network node 102 is one of the first network node 111 and the second network node 112. The secondary cell 122, 123, 124 and the primary cell 121 serve the wireless device 130 with CA in the wireless communications network 100.

It should be noted that the examples herein are not mutually exclusive. Several embodiments are comprised herein. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description.

The detailed description of some of the following corresponds to the same references provided above, in relation to the actions described for the wireless device 130, and will thus not be repeated here to simplify the description, however, it applies equally. For example, the indication may be a SCellFailureReport.

Action 601

In this Action 601, the network node 102 receives the indication from the wireless device 130. The indication is based on the determined failure of the secondary cell 122, 123, 124. The determination of the failure in the secondary cell 122, 123, 124 is based on the determination of the radio link control failure, as described earlier.

For example, in some examples wherein, the one or more criteria may be if the maximum number of retransmissions, e.g., radio link control retransmissions, has been reached.

The receiving in this Action 601 may be implemented, for example, via the second link 142, the third link 143 and/or the fourth link 144.

In some embodiments, the wireless device 130 may be not operating in DC mode. In some of such embodiments, the network node 102 may be a serving network node of the wireless device 130, and the network node 102 may receive the indication comprising the failure report.

In some embodiments, the wireless device 130 may be operating in DC mode. In some of such embodiments, the network node 102 may be the master node and a serving network node of the wireless device 130, the secondary cell 122 may belong to the first group of cells 120-1, the first group of cells 120-1 being an MSG, and the network node 102 may receive the indication comprising the failure report In some embodiments, the wireless device 130 may be operating in DC mode. In some of such embodiments, the network node 102 may be the second network node 112, the second network node 112 being a secondary node and a serving network node of the wireless device 130, the secondary cell 124 may belong to the second group of cells 120-2, the second group of cells 120-2 being an SCG, and the second network node 112 may receive the indication comprising the failure report. In some of these embodiments, the secondary cell 124 may not be a PSCell.

In some embodiments, the indication may comprise the information indicating the secondary cell 122, 123, 124 where the radio link control failure has been detected.

In some embodiments, the wireless device 130 may be operating in DC mode. In some of such embodiments, the network node 102 may be the first network node 111, the first network node 111 being a master node and a serving network node of the wireless device 130, the secondary cell 123 may belong to the second group of cells 120-2, the second group of cells 120-2 being an SCG, and the first network node 111 may receive the indication comprising the failure report. In some of these embodiments, the secondary cell 123 is a PSCell. In some of such embodiments, the failure report may be an SCG failure information report.

By receiving the indication in this Action 601, the network node 102 is enabled to take action, and handle the detected failure, as described next.

Action 602

In this Action 602, the network node 102 initiates a second procedure based on the received indication. The second procedure comprises releasing of the secondary cell 122, 123, 124.

That the network node 102 initiates the second procedure based on the received indication may be understood to mean that the second procedure is initiated when, upon, after, or only when the indication is received.

The failure may have been determined based on one or more criteria. Therefore, the receiving 601 of the indication may be considered to be based on the one or more criteria. The one or more criteria may be based on at least one of: i) whether or not duplication may be configured and/or applied; ii) whether or not duplication may be applied in a first cell group and/or a second cell group, wherein the first group of cells 120-1 and/or the second group of cells 120-2 may be serving the wireless device 130 operating in the wireless communications network 100; iii) whether the network node 102 may be a first network node 111 such as a master node, a second network node 112 such as a secondary node; and iv) whether or not dual connectivity may be applied.

In some embodiments, the first network node 111 may release a Secondary cell group configuration, that is, a configuration of the second group of cells 120-2.

By releasing the secondary cell 122, 123, 124 in this Action 602, the network node 102 is enabled to handle the secondary cell failure avoiding an RRC re-establishment, and thus setting up the whole radio from scratch.

Certain embodiments may provide one or more of the following technical advantage(s). In case of dual connectivity with CA activated, upon an RLF over a SCell, the solution in existing methods may be to call an RRC re-establishment thus setting up the whole radio from scratch. However, this procedure causes a considerable service interruption time that cannot be tolerated, for example, when considering ultra-reliable and low-latency communication (URLLC).

The embodiments disclosed herein enable to avoid an RRC re-establishment by performing actions for de-activating only the SCell where the RLF may have been detected. In this way, the wireless device 130 may continue transmitting over the other cells, e.g., (P)Cell, that are not affected by the failure.

Figure 7:
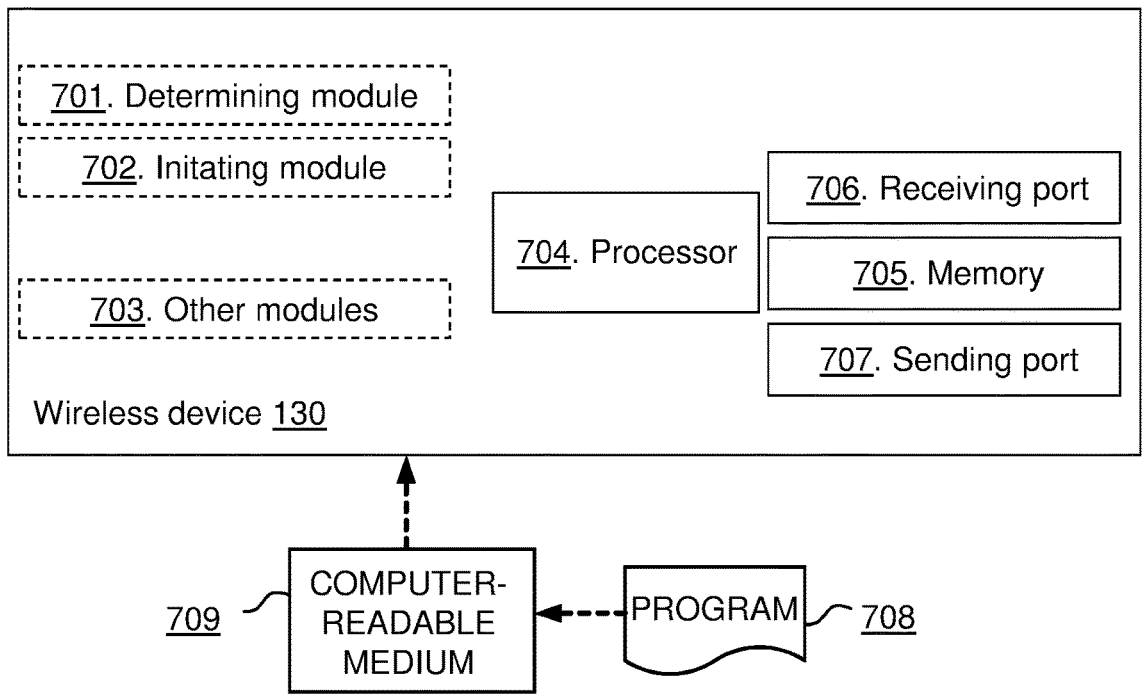
FIG. 7 is a schematic block diagram illustrating embodiments of a wireless device, according to embodiments herein.
Figure 7:
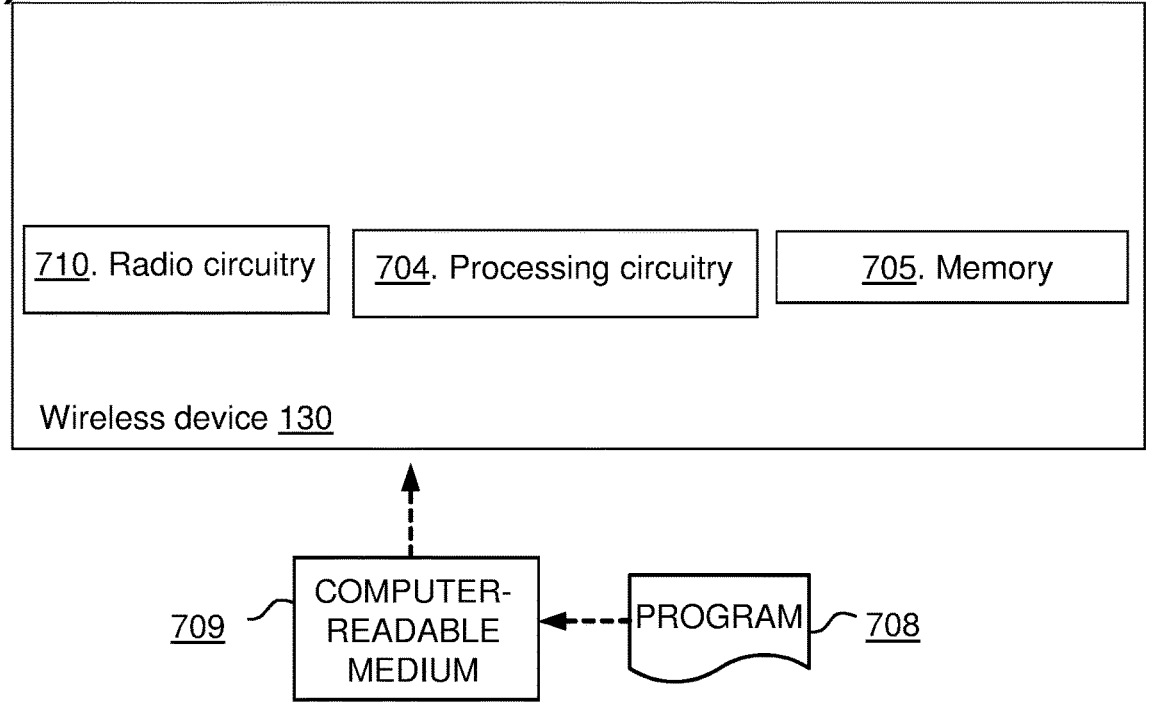

FIG. 7 depicts two different examples in panels a) and b), respectively, of the arrangement that the wireless device 130 may comprise to perform the method actions described above in relation to FIG. 5. In some embodiments, the wireless device 130 may comprise the following arrangement depicted in FIG. 7a. The wireless device 130 is configured to handle the failure in the secondary cell 122, 123, 124 configured to serve the wireless device 130. The secondary cell 122, 123, 124 and a primary cell 121 are configured to serve the wireless device 130 with CA in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the wireless device 130, and will thus not be repeated here. For example, the one or more criteria may be configured to be if a maximum number of retransmissions, e.g., radio link control retransmissions, may have been reached.

In FIG. 7, optional modules are indicated with dashed boxes.

The wireless device 130 is configured to perform the determining of action 501, e.g. by means of a determining module 701 within the wireless device 130, configured to determine the failure in the secondary cell 122, 123, 124. The determination is configured to be based on the determination of the radio link control failure. The determining module 701 may be the processor 704 of the wireless device 130, or an application running on such processor.

In some embodiments, to determine may be configured to be based on the one or more criteria. The one or more criteria may be configured to be based on at least one of: a) whether or not duplication may be configured and/or applied; and b) whether or not DC may be applied.

The wireless device 130 is also configured to perform the initiating of action 502, e.g. by means of an initiating module 702 within the wireless device 130, configured to initiate sending the indication to the network node 102. The network node 102 is configured to be one of the first network node 111 and the second network node 112. The indication is configured to be based on the failure of the secondary cell 122, 123, 124 configured to be determined. The initiating module 702 may be the processor 704 of the first node 101, or an application running on such processor.

In some embodiments, the wireless device 130 may be configured to, e.g. by means of the initiating module 702 within the wireless device 130, further configured to, where the wireless device 130 may be configured to not be operating in DC mode, and after determining the failure in the secondary cell 122, send the indication, comprising the failure report, to the first network node 111. The first network node 111 may be configured to be the serving network node of the wireless device 130.

In some embodiments, the wireless device may be configured to, e.g. by means of the initiating module 702 within the wireless device 130, further configured to, where the wireless device 130 may be configured to be operating in DC mode, and after detecting the failure in the secondary cell 122, where the secondary cell 122 may be configured to belong to the first group of cells 120-1, the first group of cells 120-1 may be configured to be the MCG, send the indication comprising the failure report to the first network node 111. The first network node 111 may be configured to be the master node and the serving network node of the wireless device 130.

In some embodiments, the wireless device 130 may be configured to, e.g. by means of the initiating module 702 within the wireless device 130, further configured to, where the wireless device 130 may be configured to be operating in DC mode, and after detecting the failure in the secondary cell 124, where the secondary cell 124 may be configured to belong to the second group of cells 120-2, the second group of cells 120-2 being configured to be an SCG, send the indication comprising the failure report to the second network node 112. The second network node 112 may be configured to be the secondary node and the serving network node of the wireless device 130. In some of these embodiments, the secondary cell 124 may be configured to not be a PSCell.

The indication may be configured to comprise information indicating the secondary cell 122, 123, 124 where the radio link control failure is configured to have been detected.

In some embodiments, the information indicating the secondary cell 122,124 may be configured to be the cell index of the secondary cell 122, 123, 124 or the identity of the failed logical channel that was configured to be associated with the secondary cell 122,123,124.

In some embodiments, the wireless device 130 may be configured to, e.g. by means of the initiating module 702 within the wireless device 130, further configured to, where the wireless device 130 may be configured to be operating in DC mode, and where after detecting the failure in the secondary cell 123, where the secondary cell 123 may be configured to belong to the second group of cells 120-2, the second group of cells 120-2 being configured to be a SCG, send the indication comprising the failure report to the first network node 111. The first network node 111 may be configured to be the master node and the serving network node of the wireless device 130. In some of these embodiments, the secondary cell 123 may be configured to be a PSCell. In some embodiments, the failure report may be configured to be an SCG failure information report.

In some embodiments, the wireless device 130 may be further configured to, e.g. by means of the initiating module 702 within the wireless device 130, further configured to, initiate a first procedure based on the determined failure, the first procedure being configured to be at least one of: i) the suspension of the radio link control entity configured to be related to the failed radio link control, or failed secondary cell 122, 124; or ii) the deactivation of the duplication via the secondary cell 122, 124 where the radio link control failure has occurred.

The embodiments herein in the wireless device 130 may be implemented through one or more processors, such as a processor 704 in the wireless device 130 depicted in FIG. 7a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 705 comprising one or more memory units. The memory 705 is arranged to be used to store obtained information, store data, configurations, schedulings, and applications etc. to perform the methods herein when being executed in the wireless device 130.

In some embodiments, the wireless device 130 may receive information from, e.g., network node 102, through a receiving port 706. In some embodiments, the receiving port 706 may be, for example, connected to one or more antennas in wireless device 130. In other embodiments, the wireless device 130 may receive information from another structure in the wireless communications network 100 through the receiving port 706. Since the receiving port 706 may be in communication with the processor 704, the receiving port 706 may then send the received information to the processor 704. The receiving port 706 may also be configured to receive other information.

The processor 704 in the wireless device 130 may be further configured to transmit or send information to e.g., the network node 102 or another structure in the wireless communications network 100, through a sending port 707, which may be in communication with the processor 704, and the memory 705.

Those skilled in the art will also appreciate that the determining module 701, the initiating module 702 and the other modules 703 described above may refer to a combination of analog and digital modules, and/or one or more processors configured with software and/or firmware, e.g., stored in memory, that, when executed by the one or more processors such as the processor 704, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 701-703 described above may be implemented as one or more applications running on one or more processors such as the processor 704.

Thus, the methods according to the embodiments described herein for the wireless device 130 may be respectively implemented by means of a computer program 708 product, comprising instructions, i.e., software code portions, which, when executed on at least one processor 704, cause the at least one processor 704 to carry out the actions described herein, as performed by the wireless device 130. The computer program 708 product may be stored on a computer-readable storage medium 709. The computer-readable storage medium 709, having stored thereon the computer program 708, may comprise instructions which, when executed on at least one processor 704, cause the at least one processor 704 to carry out the actions described herein, as performed by the wireless device 130. In some embodiments, the computer-readable storage medium 709 may be a non-transitory computer-readable storage medium, such as a CD ROM disc, or a memory stick. In other embodiments, the computer program 708 product may be stored on a carrier containing the computer program 708 just described, wherein the carrier is one of an electronic signal, optical signal, radio signal, or the computer-readable storage medium 709, as described above.

The wireless device 130 may comprise a communication interface configured to facilitate communications between the wireless device 130 and other nodes or devices, e.g., the second node 102. The interface may, for example, include a transceiver configured to transmit and receive radio signals over an air interface in accordance with a suitable standard.

In other embodiments, the wireless device 130 may comprise the following arrangement depicted in FIG. 7b. The wireless device 130 may comprise a processing circuitry 704, e.g., one or more processors such as the processor 704, in the wireless device 130 and the memory 705. The wireless device 130 may also comprise a radio circuitry 710, which may comprise e.g., the receiving port 706 and the sending port 707. The processing circuitry 704 may be configured to, or operable to, perform the method actions according to FIG. 5, in a similar manner as that described in relation to FIG. 7a. The radio circuitry 710 may be configured to set up and maintain at least a wireless connection with the network node 102. Circuitry may be understood herein as a hardware component.

Hence, embodiments herein also relate to the wireless device 130 operative to handle a failure, the wireless device 130 being operative to operate in the wireless communications network 100. The wireless device 130 may comprise the processing circuitry 704 and the memory 705, said memory 705 containing instructions executable by said processing circuitry 704, whereby the wireless device 130 is further operative to perform the actions described herein in relation to the wireless device 130, e.g., in FIG. 5.

Figure 8:
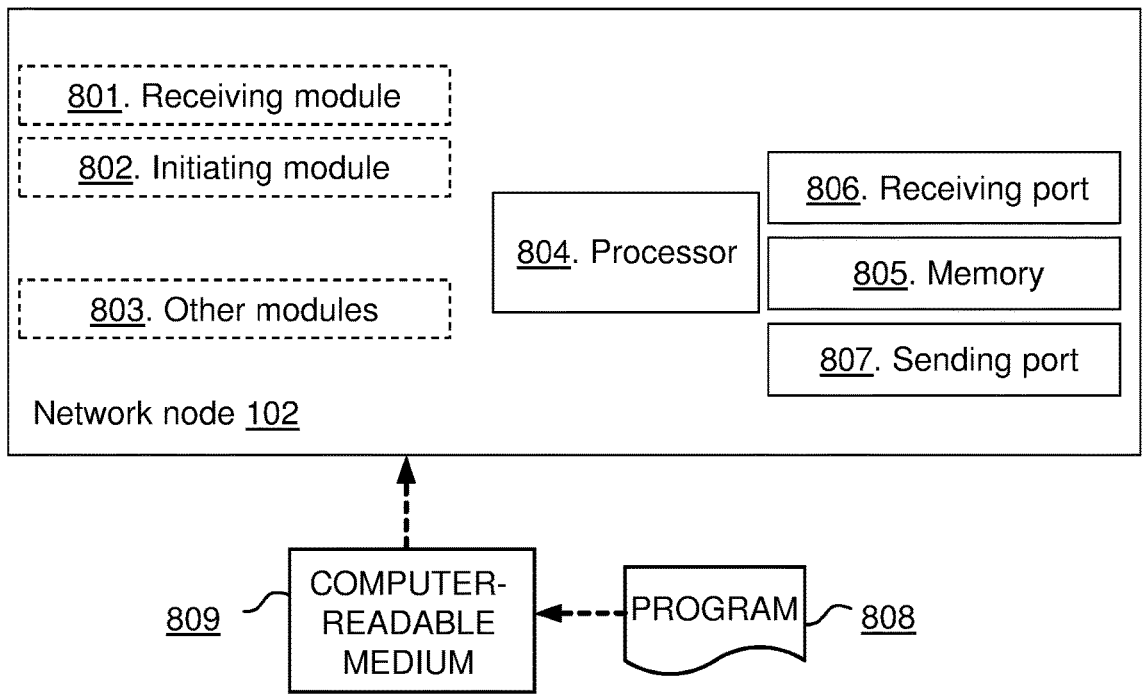
FIG. 8 is a schematic block diagram illustrating embodiments of a second node, according to embodiments herein.
Figure 8:
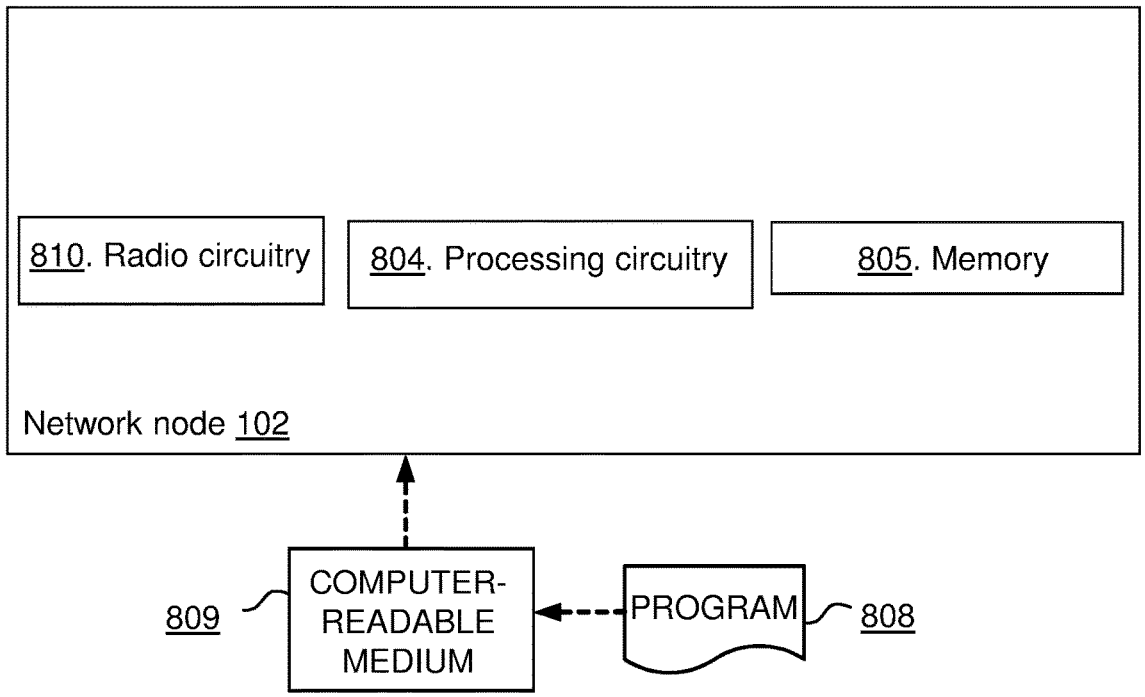

FIG. 8 depicts two different examples in panels a) and b), respectively, of the arrangement that the network node 102 may comprise to perform the method actions described above in relation to FIG. 6. In some embodiments, the network node 102 may comprise the following arrangement depicted in FIG. 8a. The network node 102 is configured to handle the failure in the secondary cell 122, 123, 124. The network node 102 is configured to be one of the first network node 111 and the second network node 112. The secondary cell 122, 123, 124 and the primary cell 121 are configured to serve the wireless device 130 with CA in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the network node 102, and will thus not be repeated here. For example, the indication may be configured to be a SCellFailureReport.

In FIG. 8, optional modules are indicated with dashed boxes.

The network node 102 is configured to perform the receiving of Action 601, e.g. by means of a receiving module 801 within the network node 102, configured to receive the indication from the wireless device 130. The indication may be configured to be based on the failure of the secondary cell 122, 123, 124 configured to be determined. The determination of the failure in the secondary cell 122, 123, 124 may be configured to be based on the determination of the radio link control failure. The receiving module 801 may be a processor 804 of the first node 102, or an application running on such processor.

The network node 102 is configured to perform the initiating of Action 602, e.g. by means of an initiating module 802 within the network node 102, configured to initiate the second procedure based on the received indication. The second procedure is configured to comprise releasing of the secondary cell 122, 123, 124. The initiating module 802 may be the processor 804 of the network node 102, or an application running on such processor.

In some embodiments wherein the wireless device 130 may be configured to not be operating in DC mode, and wherein the network node 102 may be configured to be the serving network node of the wireless device 130, the network node 102 may be configured to, e.g. by means of the receiving module 801 within the network node 102, further configured to, receive the indication comprising the failure report.

In some embodiments wherein the wireless device 130 may be configured to be operating in DC mode, and wherein the network node 102 may be configured to be the master node and the serving network node of the wireless device 130, and wherein the secondary cell 122 may be configured to belong to the first group of cells 120-1, the first group of cells 120-1 being configured to be a the MSG, the network node 102 may be configured to, e.g. by means of the receiving module 801 within the network node 102, further configured to, receive the indication comprising the failure report.

In some embodiments wherein the wireless device 130 may be configured to be operating in DC mode, wherein the network node 102 may be configured to be the second network node 112, the second network node 112 being configured to be the secondary node and the serving network node of the wireless device 130, and wherein the secondary cell 124 may be configured to belong to the second group of cells 120-2, the second group of cells 120-2 being configured to be the SCG, the second network node 112 may be configured to, e.g. by means of the receiving module 801 within the network node 102, further configured to, receive the indication comprising the failure report. In some of these embodiments, the secondary cell 124 may be configured to not be a PSCell.

In some embodiments, the indication may be configured to comprise the information indicating the secondary cell 122, 123, 124 where the radio link control failure may be configured to have been detected.

In some embodiments wherein the wireless device 130 may be configured to be operating in DC mode, wherein the network node 102 may be configured to be the first network node 111, wherein the first network node 111 may be configured to be the master node and the serving network node of the wireless device 130, and wherein the secondary cell 123 may be configured to belong to the second group of cells 120-2, the second group of cells 120-2 being configured to be an SCG, the first network node 111 may be configured to, e.g. by means of the receiving module 801 within the network node 102, further configured to, receive the indication comprising the failure report. In some of these embodiments, the secondary cell 123 may be configured to be a PSCell. The failure report may be configured to be an SCG failure information report. In some embodiments, the first network node 111 may be configured to release the Secondary cell group configuration.

The embodiments herein in the network node 102 may be implemented through one or more processors, such as a processor 804 in the network node 102 depicted in FIG. 8a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the network node 102. One such carrier may be in the form of a CD ROM disc. It is however feasible with other data carriers such as a memory stick. The computer program code may furthermore be provided as pure program code on a server and downloaded to the network node 102.

The network node 102 may further comprise a memory 805 comprising one or more memory units. The memory 805 is arranged to be used to store obtained information, store data, configurations, schedulings, and applications etc. to perform the methods herein when being executed in the network node 102.

In some embodiments, the network node 102 may receive information from, e.g., the wireless device 130, through a receiving port 806. In some embodiments, the receiving port 806 may be, for example, connected to one or more antennas in network node 102. In other embodiments, the network node 102 may receive information from another structure in the wireless communications network 100 through the receiving port 806. Since the receiving port 806 may be in communication with the processor 804, the receiving port 806 may then send the received information to the processor 804. The receiving port 806 may also be configured to receive other information.

The processor 804 in the network node 102 may be further configured to transmit or send information to e.g., the wireless device 130, or another structure in the wireless communications network 100, through a sending port 807, which may be in communication with the processor 804, and the memory 805.

Those skilled in the art will also appreciate that the receiving module 801, the initiating module 802, and the other modules 803 described above may refer to a combination of analog and digital modules, and/or one or more processors configured with software and/or firmware, e.g., stored in memory, that, when executed by the one or more processors such as the processor 804, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 801-803 described above may be implemented as one or more applications running on one or more processors such as the processor 804.

Thus, the methods according to the embodiments described herein for the network node 102 may be respectively implemented by means of a computer program 808 product, comprising instructions, i.e., software code portions, which, when executed on at least one processor 804, cause the at least one processor 804 to carry out the actions described herein, as performed by the network node 102. The computer program 808 product may be stored on a computer-readable storage medium 809. The computer-readable storage medium 809, having stored thereon the computer program 808, may comprise instructions which, when executed on at least one processor 804, cause the at least one processor 804 to carry out the actions described herein, as performed by the network node 102. In some embodiments, the computer-readable storage medium 809 may be a non-transitory computer-readable storage medium, such as a CD ROM disc, or a memory stick. In other embodiments, the computer program 808 product may be stored on a carrier containing the computer program 808 just described, wherein the carrier is one of an electronic signal, optical signal, radio signal, or the computer-readable storage medium 809, as described above.

The network node 102 may comprise a communication interface configured to facilitate communications between the network node 102 and other nodes or devices, e.g., the wireless device 130. The interface may, for example, include a transceiver configured to transmit and receive radio signals over an air interface in accordance with a suitable standard.

In other embodiments, the network node 102 may comprise the following arrangement depicted in FIG. 8b. The network node 102 may comprise a processing circuitry 804, e.g., one or more processors such as the processor 804, in the network node 102 and the memory 805. The network node 102 may also comprise a radio circuitry 810, which may comprise e.g., the receiving port 806 and the sending port 807. The processing circuitry 810 may be configured to, or operable to, perform the method actions according to FIG. 6, in a similar manner as that described in relation to FIG. 8a. The radio circuitry 810 may be configured to set up and maintain at least a wireless connection with the wireless device 130. Circuitry may be understood herein as a hardware component.

Examples Related to Embodiments Herein

In some examples related to embodiments herein, any of the first node 101 and the second node 102 may be a network node, as any of the first network node 111, or the second network node 112 described earlier, or a wireless device, as the wireless device 130 described earlier. In some examples, as described above, the first node 101 may be wireless device 130, and the second node 102 may be one of the first network node 111, or the second network node 112.

More specifically, the following are: a) a first group of examples related to a first node, which may be also referred to as a detecting node, such as the first network node 111, the second network node 112, or the wireless device 130, e.g., a 5G UE; and b) a second group of examples related to a second node, which may also be referred to as a receiving node, such as the first network node 111, the second network node 112, or the wireless device 130. The first node 101 may be different than the first node 102, although in some examples, they may be co-located, e.g., when they are respectively the first network node 111 and the second network node 112.

Figure 5:
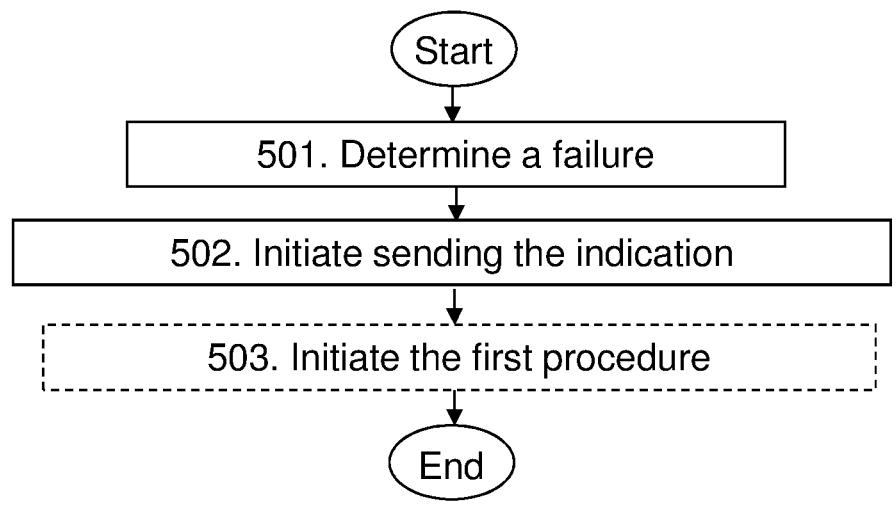
FIG. 5 is a flowchart depicting a method in a wireless device, according to embodiments herein.

FIG. 5 and FIG. 7 relate to the first node 101 in first group of examples. Any description provided so far in relation to FIG. 7 may be understood to equally apply to the first node 101, as described in the first group of examples.

A method, performed by a first node 101, which may also be known as a detecting node may comprise one or more of the following actions. The method may be, for handling a failure. The failure may be a radio link failure or an SCG failure. The failure may be in a secondary cell 122, 124. The secondary cell 122, 124 may be associated with the first node 101. The first node 101 may operate in a wireless communications network, such as the wireless communications network 100. The first node 101, may operate in the wireless communications network 100 with carrier aggregation.

In some examples all the actions may be performed. In some examples, one or more actions may be performed. One or more examples may be combined, where applicable. All possible combinations are not described to simplify the description. In FIG. 5, optional actions are indicated with dashed lines.

Determining 501, or detecting, the failure, e.g., in the secondary cell 122, 124. The determination of the failure in the secondary cell 122, 124 may be based on a determination of a radio link control failure. The first node 101 may be configured to perform this determining 501 action, e.g. by means of a determining module 701 within the first node 101, configured to perform this action. The determining module 701 may be a processor 704 of the first node 101, or an application running on such processor.

The determining 501 may be based on one or more criteria.

The one or more criteria may be based on at least one of:
i. whether or not duplication is configured and/or applied;
ii. whether or not duplication is applied in a first cell group and/or a second cell group, wherein the first cell group and/or the second cell group may be serving a wireless device 130 operating in the wireless communications network 100;
iii. whether the first node 101 is a first network node 111 such as a master node, a second network node 112 such as a secondary node, or a wireless device 130; and
iv. whether or not dual connectivity is applied.

For example, in some examples wherein the first node 101 may be the wireless device 130, the one or more criteria may be if a maximum number of retransmissions, e.g., radio link control retransmissions, has been reached.

In some examples wherein the first node 101 may be the second network node 112, the one or more criteria may be based on counting the not received RLC retransmissions after triggering each retransmission by sending an RLC status report.

The secondary cell 122, 124 may associated with the first node 101 by one of:
a) the secondary cell 122, 124 may be controlled by the first node 111, 112 to serve the wireless device 130 operating in the wireless communications network 100, and
b) the secondary cell 122, 124 may serve the first node 130, wherein the first node 130 is the wireless device 130.

Initiating 502 sending an indication to the first node 102 operating in the wireless communications network 100. The indication may be based on the determined failure, e.g., of the secondary cell 122, 124, which may be a radio link control failure. The first node 101 may be configured to perform this initiating 502 action, e.g. by means of an initiating module 702 within the first node 101. The initiating module 702 may be the processor 704 of the first node 101, or an application running on such processor.

The indication may be for example a SCellFailureReport.

The indication may comprise information indicating the secondary cell 122, 124 where the radio link control failure has been detected.

In such embodiments, the method may further comprise the action of:

Initiating 503 a first procedure based on the determined failure. The first node 101 may be configured to perform this initiating 503 action, e.g. by means of the initiating module 702 within the first node 101, configured to perform this action.

The first procedure at least one of: a) a suspension of a radio link control entity related to the failed radio link control, or failed secondary cell 122, 124, and b) a deactivation of the secondary cell 122, 124 where the radio link control failure has occurred. The first procedure may comprise a release of the secondary cell 122, 124 where the radio link control failure has occurred.

Other modules 703 may be comprised in the first node 101.

In FIG. 7, optional modules are indicated with dashed boxes.

The first node 101 may comprise an interface unit to facilitate communications between the first node 101 and other nodes or devices, e.g., the first node 102, or any of the other nodes. In some particular examples, the interface may, for example, include a transceiver configured to transmit and receive radio signals over an air interface in accordance with a suitable standard.

The first node 101 may comprise an arrangement as shown in FIG. 7.

Figure 6:
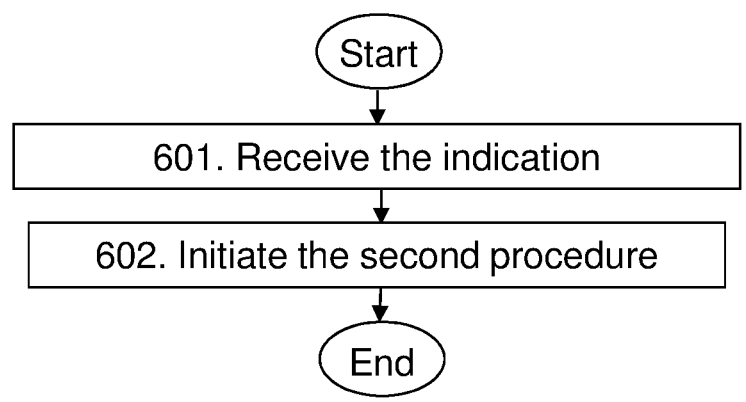
FIG. 6 is a flowchart depicting a method in a second node, according to embodiments herein.

FIG. 6 and FIG. 8 relate to the first node 102 in the second group of examples. Any description provided so far in relation to FIG. 8 may be understood to equally apply to the second node 102, as described in the second group of examples.

A method, performed by the second node 102, which may also be known as a receiving node may comprise one or more of the following actions. The method may be, for handling a failure. The failure may be a radio link failure or an SCG failure. The failure may be in a secondary cell 122, 124. The secondary cell 122, 124 may be associated with the second node 102. The second node 102 may operate in a wireless communications network, such as the wireless communications network 100. The second node 102, may operate in the wireless communications network 100 with carrier aggregation.

In some examples all the actions may be performed. In some examples, one or more actions may be performed. One or more examples may be combined, where applicable. All possible combinations are not described to simplify the description. In FIG. 6, optional actions are indicated with dashed lines.

Receiving 601 the indication from the first node 101 operating in the wireless communications network 100. The first node 102 may be configured to perform this receiving 601 action, e.g. by means of a receiving module 801 within the first node 102, configured to perform this action. The receiving module 801 may be a processor 804 of the first node 102, or an application running on such processor.

The indication may be based on the determined failure, e.g., of the secondary cell 122, 124, which may be a radio link control failure.

The indication may be for example a SCellFailureReport.

The indication may comprise information indicating the secondary cell 122, 124 where the radio link control failure has been detected.

The failure may have been determined based on one or more criteria. Therefore, the receiving 601 of the indication may be considered to be based on the one or more criteria.

The one or more criteria may be based on at least one of:
i. whether or not duplication is configured and/or applied;
ii. whether or not duplication is applied in a first cell group and/or a second cell group, wherein the first cell group and/or the second cell group may be serving a wireless device 130 operating in the wireless communications network 100;

iii. whether the first node 101 is a first network node 111 such as a master node, a second network node 112 such as a secondary node, or a wireless device 130; and iv. whether or not dual connectivity is applied.

Initiating 602 a second procedure based on the received indication. The first node 102 may be configured to perform this initiating 602 action, e.g. by means of an initiating module 802 within the first node 102, configured to perform this action. The initiating module 802 may be the processor 804 of the network node 110, or an application running on such processor.

The second procedure may be one of: a) a suspension of a radio link control entity related to the failed radio link control, or failed secondary cell 122, 124; and b) a deactivation of the secondary cell 122, 124 where the radio link control failure has occurred. The second procedure may comprise a release of the secondary cell 122, 124 where the radio link control failure has occurred.

For example, in some examples wherein the first node 101 may be the wireless device 130, the one or more criteria may be if a maximum number of retransmissions, e.g., radio link control retransmissions, has been reached.

In some examples wherein the first node 101 may be the second network node 112, the one or more criteria may be based on counting the not received RLC retransmissions after triggering each retransmission by sending an RLC status report.

Other modules 803 may be comprised in the first node 102.

In FIG. 8, optional modules are indicated with dashed boxes.

In particular embodiments, the second node 111, 112 is one of: the first network node 111 and/or the second network node 112.

Examples related to embodiments herein will now be described with some non-limiting examples. In the following description any reference to a/the UE may be understood to relate to the wireless device 130, and any reference to a/the network may be understood to relate to any of the first network node 111 or the second network node 112, based on context. Any reference to a/the MN or master node may be understood to relate to the first network node 111. Any reference to a/the SN or secondary node may be understood to relate to the second network node 112. Any of the examples provided here may be understood to be able to be combined with the embodiments herein, described earlier.

Note that although the focus here is on the LTE-NR tight interworking case where the LTE is the master node, examples herein are also applicable to other DC cases such as LTE-NR DC where NR is the master and LTE is the secondary node (NE-DC), NR-NR DC where both the master and secondary nodes are NR nodes, or even between LTE/NR and other RATs

UE EXAMPLES

Example 1

A UE employing CA, when detecting the maximum number of RLC retransmissions has been reached, sends an SCellFailureReport towards a network node.

Example 2

An method according to example 1, where CA level duplication is being employed, and the maximum number of RLC retransmissions is reached on one of the carriers mapped to the duplicated bearer.

Example 3

A UE employing CA keeps track of the association of the RLC entity and the carrier to which the RLC packets from that entity are being sent to, and it also counts the number of failures that resulted from using that carrier.

Example 4

A method according to example 3, where the failure count of the carrier is per RLC packet. That is, several failure counters can be initiated whenever an RLC packet is sent over a given carrier, and incremented each time there is a failure. If the RLC packet is successfully sent, the failure count for that counter associated with the carrier and the concerned RLC packet is removed.

Example 4a

A method according to example 4, if the maximum number of failures is reached (a value configured by the network or by the UE) for any of the failure counters, the UE considers the threshold for reporting SCellFailureReport is reached.

Example 4b

A method according to example 4, if the sum of all the active failure counters reaches a certain value (a value configured by the network or the UE), the UE considers the threshold for reporting SCellFailureReport is reached.

Example 5

A method according to example 3, where the failure count of the carrier is per carrier, regardless of which RLC packet it is transmitting. The failure counter is updated for each failure, within a given time window (a configurable amount). If a certain number of or percentage of failures (as compared to the successful ones) are reached (also configurable values) within the time window, the UE considers the threshold for reporting SCellFailureReport is reached.

Example 6

A method according to any of the examples 1 to 5, where the SCellFailureReport contains information indicating the SCell where the failure was detected.

Example 7

A method according to any of the examples 1 to 6, where the UE is not operating in DC mode detects the SCell failure, it sends the failure report to the serving network node.

Example 8

A method according to any of the examples 1 to 6, where the UE is operating in DC mode detects a failure on an SCell belonging to the MCG, it sends the report to the master node.

Example 9

A method according to any of the examples 1 to 6, where the UE is operating in DC mode detects a failure an SCell belonging to the SCG, it sends the report to the master node.

Example 9a

A method according to example 9, where the failed SCell is not the PSCell

Example 10

A method according to any of the examples 1 to 6, where the UE is operating in DC mode detects a failure an SCell belonging to the SCG, it sends the report to the secondary node.

Example 10a

A method according to example 10, where the failed SCell is not the PSCell

Example 11

A method according to example 10, where if the UE has SCG SRB configured, the failure report is sent directly to the secondary node via the SCG SRB.

Example 12

A method according to example 10, where if the UE has no SCG SRB configured, the failure report is sent to the secondary node embedded in an MCG SRB.

Example 13

A method according to examples 1 to 12, where the SCellFailureReport is a new RRC message.

Example 14

A method according to examples 1 to 12, where the SCellFailureReport is an enhanced SCGFailureInformation report

Example 15

A method according to examples 13 or 14, where the failure report includes the SCell identity

Example 16

A method according to examples 13 or 14, where the failure report includes an indication whether the failed SCell belongs to the MCG or SCG.

Example 17

A method according to the previous examples, when the failure is detected on the PCell, the UE triggers RLF and radio-establishment

Example 18

A method according to the previous examples, when the failure is detected on the PSCell, the UE triggers legacy SCGFailureInformation reporting towards the master node.

Example 19

After or upon the sending of the SCell failure report according to the previous examples, the UE suspends the RLC entity related to the failed SCell.

Example 20

A method according to the previous examples, where if duplication was activated, UE deactivates the SCell and flushes the HARQ entity associated with the failed SCell.

Example 21

A method according to example 20, where after duplication is de-activated, the UE logical channel to carrier restriction is kept for the remaining channels so that data are not scheduled on the failed SCell. This is an exceptional behavior in the case of SCell failure, since acc. to current 3GPP agreements, when duplication is deactivated, the remaining RLC channels transmit on all SCells (no restriction applied).

NETWORK EXAMPLES

Example 22

Upon receiving SCell failure information by the UE (i.e., SCell failure report) or by the MN (via an inter-node message, which is triggered by SCGFailureInformation), the SN releases the current (failing) SCell.

Example 23

Upon detecting SCell failure information by the UE (SCell failure report) or by the MN (via an inter-node message, which is triggered by SCGFailureInformation), the SN configures the UE to use a new SCell.

Example 24

The SN performs the SCell Failure detection (e.g. SN may assume that that the SCG leg has failed/is about to fail if it detects that the SRS signal quality/strength becomes much lower than a certain expected threshold, (N)ACKs anticipated from the UE are not received on time, etc.)

Example 25

The SN performs the SCell Failure detection by counting the not received RLC retransmissions after triggering each retransmission by sending an RLC status report.

Example 25a

The failure counting on a single carrier is per RLC packet. That is, several failure counters can be initiated whenever an RLC packet is sent over a given carrier, and incremented each time there is a failure. If the RLC packet is successfully sent, the failure count for that counter associated with the carrier and the concerned RLC packet is removed.

Examples 25b

The failure counting on a single carrier is per carrier, regardless of which RLC packet it is transmitting. The failure counter is updated for each failure, within a given time window (a configurable amount). If a certain number of or percentage of failures (as compared to the successful ones) are reached (also configurable values) within the time window than a failure on that carrier is detected.

Example 26

Upon detecting the SCell Failure according to example 24-25b, the SN reports the failure information to the MN through an inter-node message, including the identity of the UE, the identity of the failed logical channel (or bearer) and SCell for which the radio link failure has been detected.

Example 27

Upon detecting SCell failure according to examples 24-25b, if a PSCell has been activated in the SN, the SN immediately deactivates the SCell and flush the HARQ entity associated with the SCell is duplication is active.

Example 27a

The MN or SN sends an RRCConnectionReconfiguration message to the UE to communicate the new radio configuration, After detecting the failure, the MN or SN de-configuring or deactivating duplication for the UE (by RRC signaling or MAC CE for duplication deactivation). The MN or SN de-configuring the RLC logical channel and/or the radio bearer associated with the failed SCell.

Example 28

Upon detecting SCell failure according to example 26, the MN immediately deactivate the SCell and flush the HARQ entity associated with the SCell only if duplication is/was active.

Example 29

Upon detecting SCell failure either according to examples 24-25b, the SN releases the current SCell.

Example 30

Upon detecting SCell failure either according to examples 24-25b, the SN configures the UE to use a new SCell.

Example 31

Upon detecting SCell failure according to example 26 or based on receiving SCGFailureInformation (including SCellFailure information), the MN releases the current SCell.

Example 32

Upon detecting SCell failure according to example 26 or based on receiving SCGFailureInformation (including SCellFailure information), the MN configures the UE to use a new SCell.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Further Extensions and Variations

Figure 9:
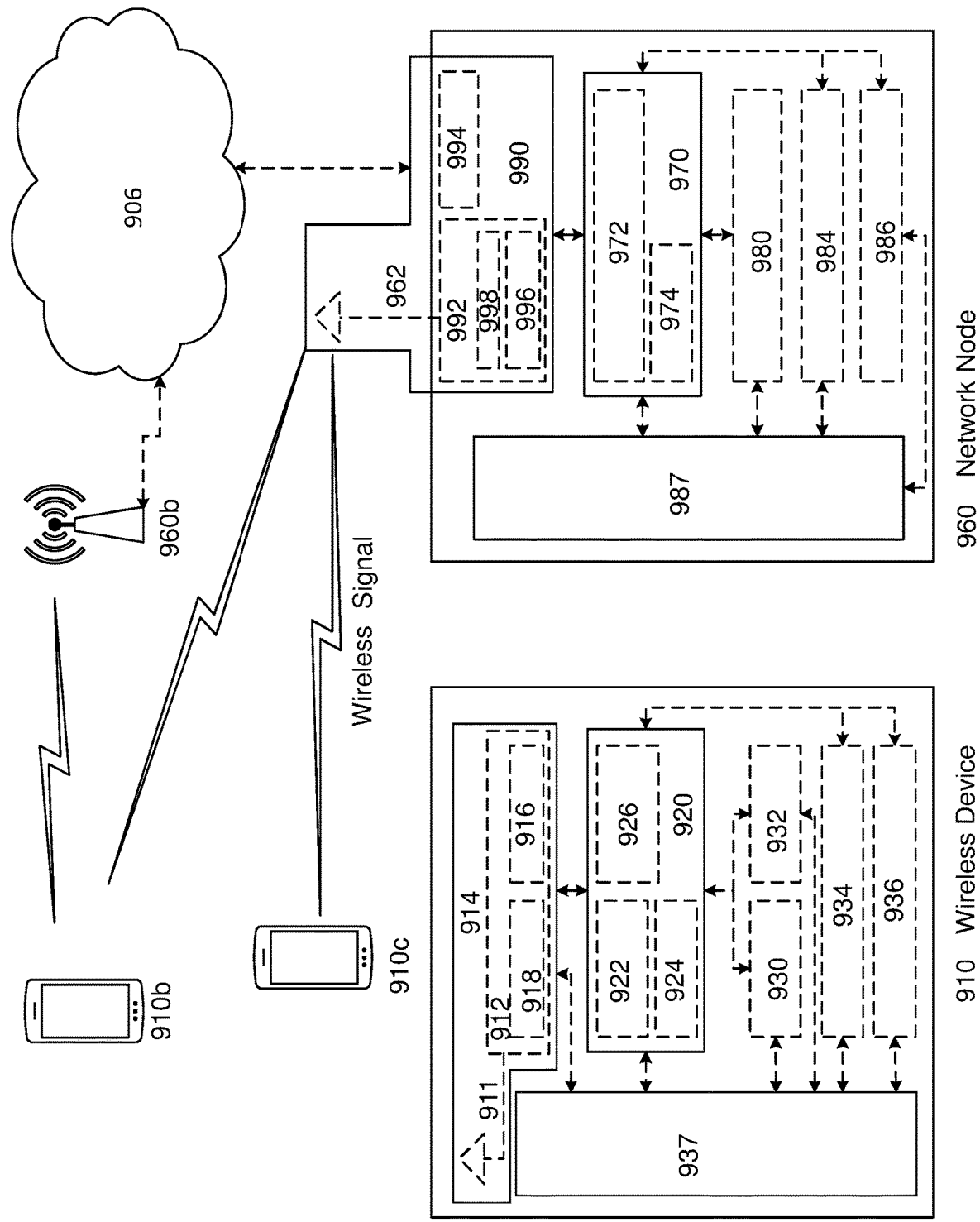
FIG. 9 is a schematic block diagram illustrating a wireless network, according to embodiments herein.

FIG. 9: A Wireless Network in Accordance with Some Embodiments.

Although the subject matter described herein may be implemented in any appropriate type of system using any suitable components, the embodiments disclosed herein may be described in relation to a wireless network, such as the example wireless network illustrated in FIG. 9. The wireless communications network 100 may be considered an example of the wireless network illustrated in FIG. 9. For simplicity, the wireless network of FIG. 9 only depicts network 906, network nodes 960 and 960b, and WDs 910, 910b, and 910c. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. Any of the first network node 111 and the second network node 112, that is, the network node 102, may be considered examples of the network node 960. The wireless device 130 may be considered an example of the wireless device (WD) 910. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signaling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
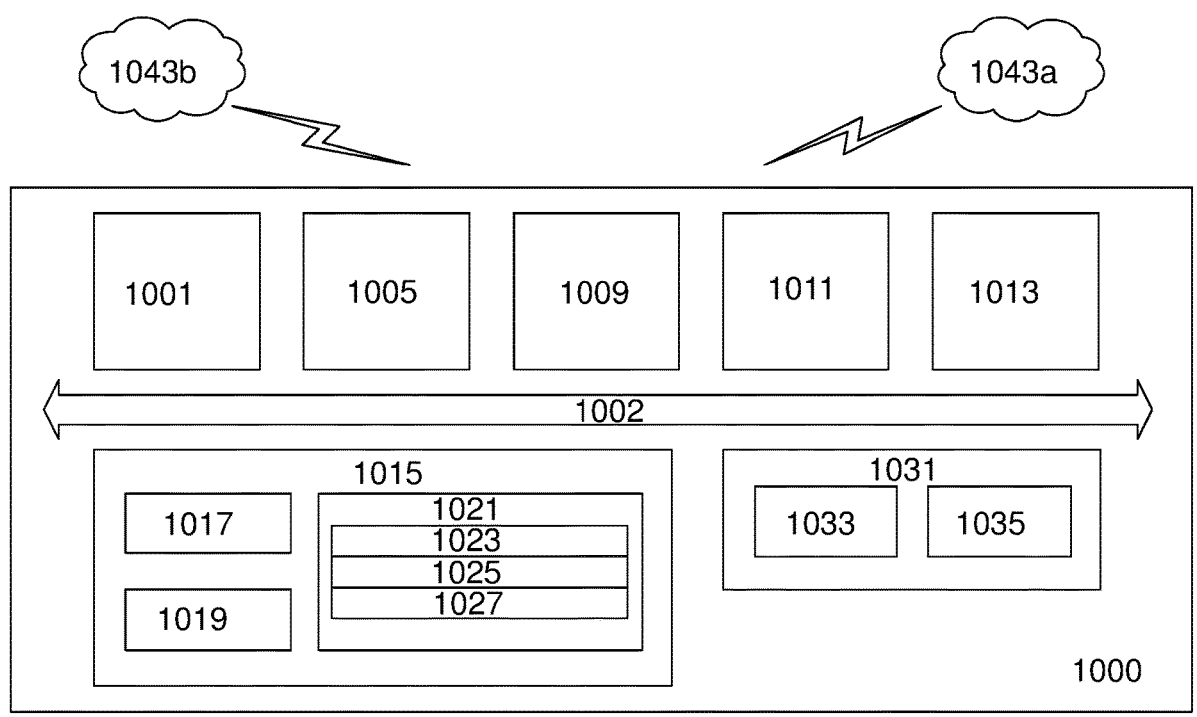
FIG. 10 is a schematic block diagram illustrating a user equipment, according to embodiments herein.

FIG. 10: User Equipment in Accordance with Some Embodiments

FIG. 10 illustrates one embodiment of a UE in accordance with various aspects described herein, such as wireless device 130. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 10200 may be any UE identified by the $3^{rd}$ Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043b using communication subsystem 1031. Network 1043a and network 1043b may be the same network or networks or different network or networks. Communication subsystem 1031 may be configured to include one or more transceivers used to communicate with network 1043b. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043b may encompass wired and/or wireless networks such as a local-area network (LAN), a wide-area network (WAN), a computer network, a wireless network, a telecommunications network, another like network or any combination thereof. For example, network 1043b may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
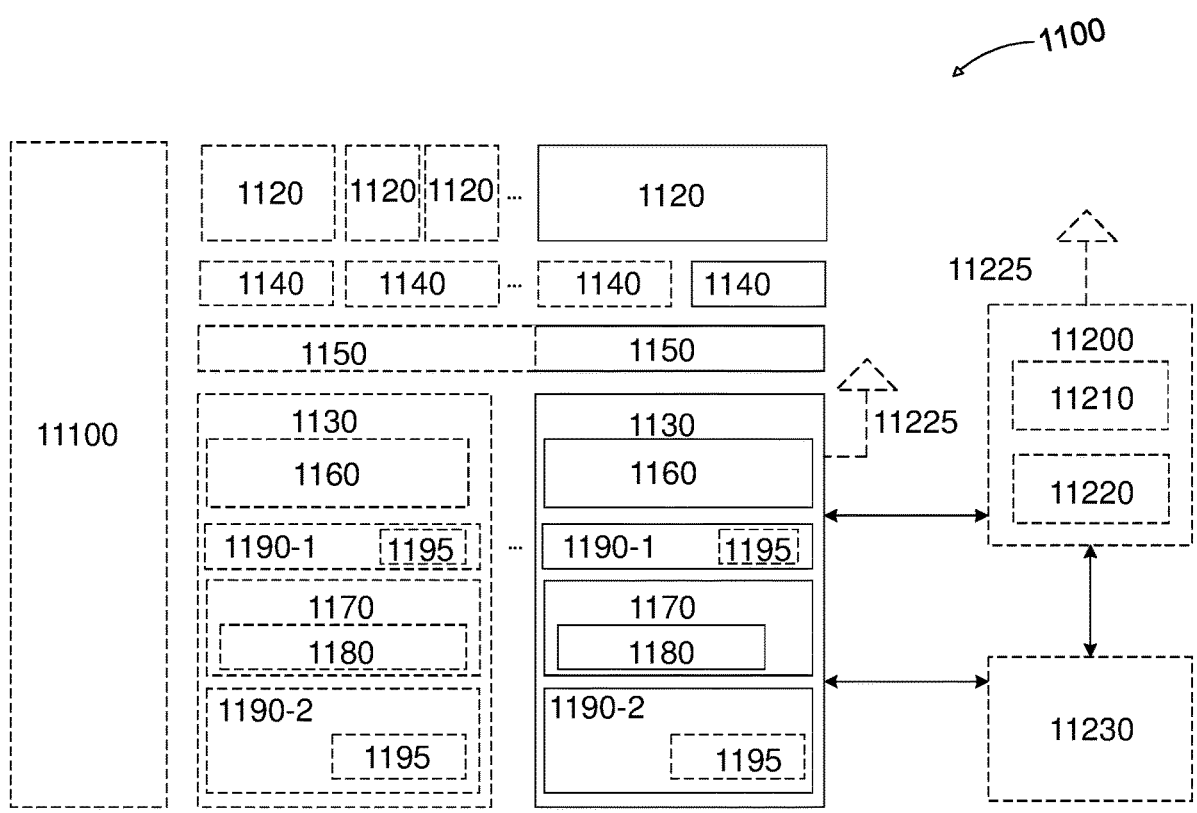
FIG. 11 is a schematic block diagram illustrating a virtualization environment, according to embodiments herein.

FIG. 11: Virtualization Environment in Accordance with Some Embodiments

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node, such as the network node 102, that is, any of the first network node 111 or the second network node 112 described above) or to a device (e.g., a UE, a wireless device or any other type of communication device, such as the wireless device 130) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signaling can be effected with the use of control system 11230 which may alternatively be used for communication between the hardware nodes 1130 and radio units 11200.

Figure 12:
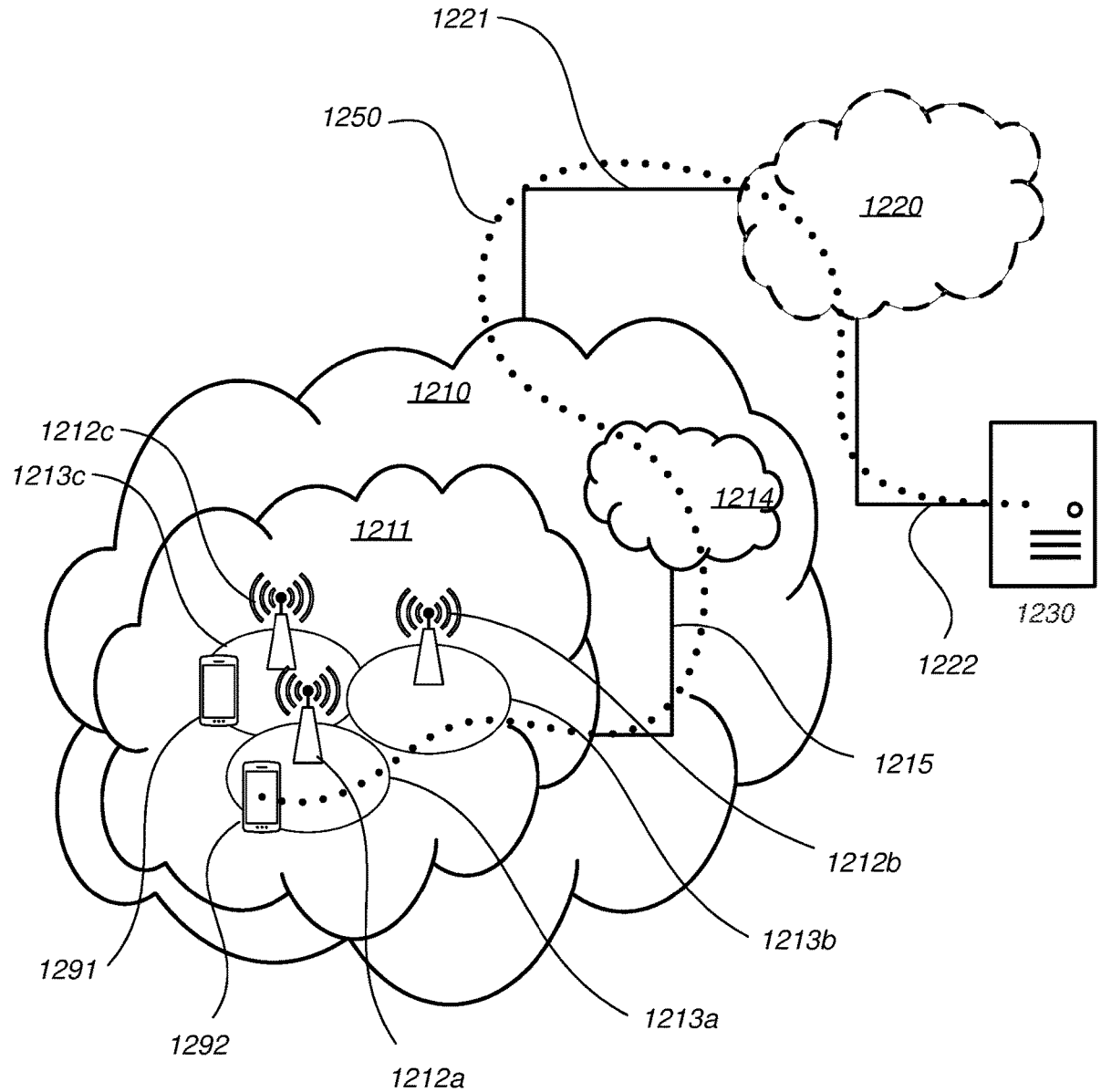
FIG. 12 is a schematic block diagram illustrating a telecommunication network connected via an intermediate network to a host computer, according to embodiments herein.

FIG. 12: Telecommunication Network Connected via an Intermediate Network to a Host Computer in Accordance with Some Embodiments With reference to FIG. 12, in accordance with an embodiment, a communication system includes telecommunication network 1210, such as a 3GPP-type cellular network, which comprises access network 1211, such as a radio access network, and core network 1214. The telecommunication network 1210 may be, for example, the wireless communications network 100. Access network 1211 comprises a plurality of base stations 1212a, 1212b, 1212c, such as NBs, eNBs, gNBs or other types of wireless access points, each defining a corresponding coverage area 1213a, 1213b, 1213c. Any of the base stations 1212a, 1212b, 1212c may be, for example, the first network node 111 or the second network node 112, that is, of the network node 102. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212. Any of the first UE 1291 and the second UE 1292 may be, for example, the wireless device 130.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

In relation to FIGS. 13, 14, 15, 16 and 17, which are described next, it may be understood that a UE is an example of the wireless device 130, and that any description provided for the UE equally applies to the wireless device 130. It may be also understood that the base station is an example of the network node 102, and that any description provided for the base station equally applies to the network node 102, that is, any of the first network node 111 or the second network node 112 described above.

Figure 13:
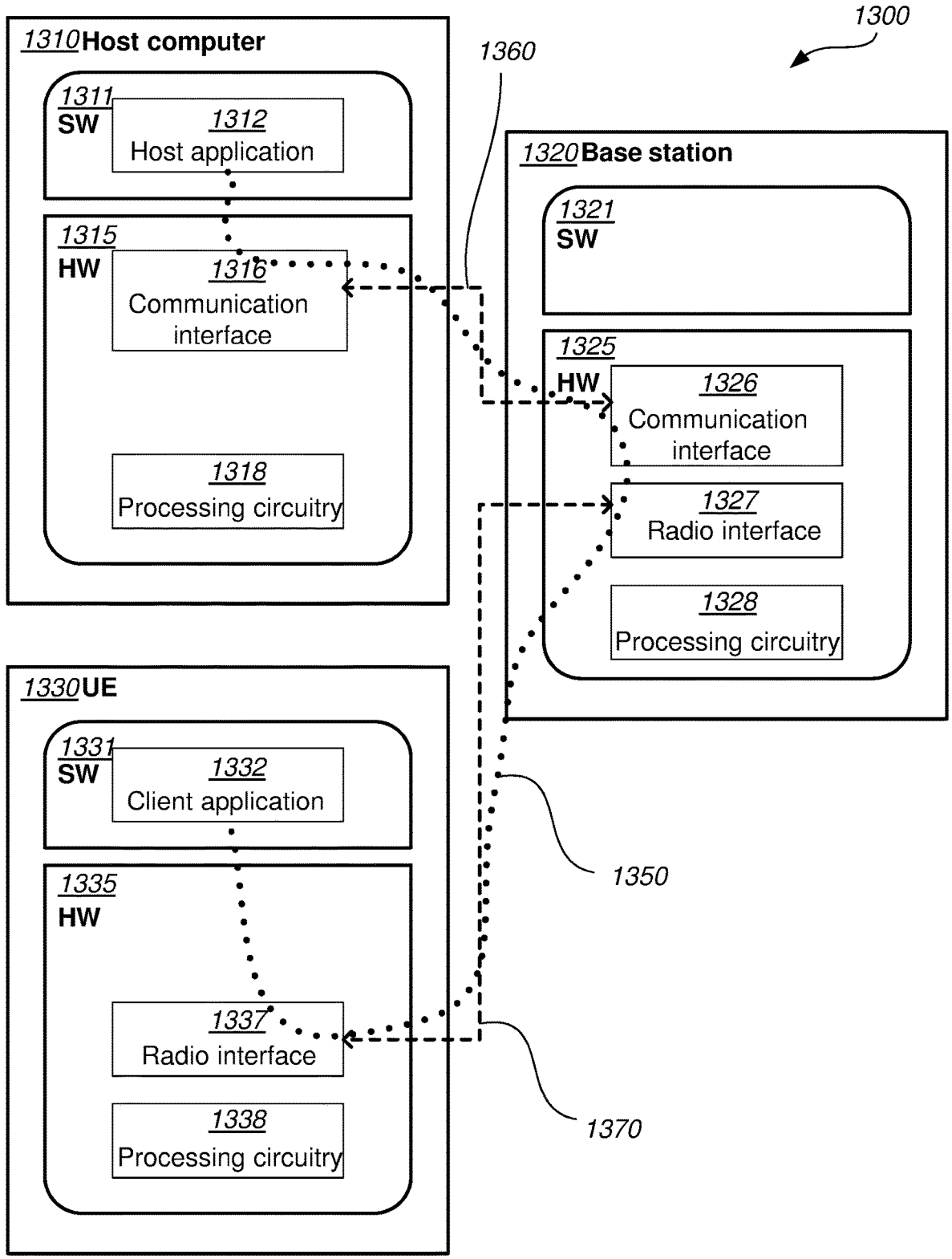
FIG. 13 is a generalized block diagram of a host computer communicating via a base station with a user equipment over a partially wireless connection, according to embodiments herein.

FIG. 13: Host Computer Communicating via a Base Station with a User Equipment Over a Partially Wireless Connection in Accordance with Some Embodiments Example implementations, in accordance with an embodiment, of the UE, base station, and host computer discussed in the preceding paragraphs will now be described with reference to FIG. 13. In communication system 1300, such as the wireless communications network 100, for example, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the latency, signaling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

FIG. 14: Methods Implemented in a Communication System Including a Host Computer, a Base Station and a User Equipment in Accordance with Some Embodiments FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

FIG. 15: Methods Implemented in a Communication System Including a Host Computer, a Base Station and a User Equipment in Accordance with Some Embodiments FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

FIG. 16: Methods Implemented in a Communication System Including a Host Computer, a Base Station and a User Equipment in Accordance with Some Embodiments FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

FIG. 17: Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Embodiments herein may be related to: Carrier Aggregation, LTE-NR tight interworking, SRB, DRB, Direct SRB, RLF, Split SRB, SCG failure, re-establishment, and/or Scheduling Request.

Further Numbered Embodiments

1. A base station configured to communicate with a user equipment (UE), the base station comprising a radio interface and processing circuitry configured to perform one or more of the actions described herein as performed by the network node 102.

5. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform one or more of the actions described herein as performed by the network node 102.

6. The communication system of embodiment 5, further including the base station.

7. The communication system of embodiment 6, further including the UE, wherein the UE is configured to communicate with the base station.

8. The communication system of embodiment 7, wherein:

the processing circuitry of the host computer is configured to execute a host application, thereby providing the user data; and the UE comprises processing circuitry configured to execute a client application associated with the host application.

11. A method implemented in a base station, comprising one or more of the actions described herein as performed by the network node 102.

15. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs one or more of the actions described herein as performed by the network node 102.

16. The method of embodiment 15, further comprising:
at the base station, transmitting the user data.

17. The method of embodiment 16, wherein the user data is provided at the host computer by executing a host application, the method further comprising:
at the UE, executing a client application associated with the host application.

21. A user equipment (UE) configured to communicate with a base station, the UE comprising a radio interface and processing circuitry configured to perform one or more of the actions described herein as performed by the wireless device 130.

25. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured to perform one or more of the actions described herein as performed by the wireless device 130.

26. The communication system of embodiment 25, further including the UE.

27. The communication system of embodiment 26, wherein the cellular network further includes a base station configured to communicate with the UE.

28. The communication system of embodiment 26 or 27, wherein:
the processing circuitry of the host computer is configured to execute a host application, thereby providing the user data; and
the UE's processing circuitry is configured to execute a client application associated with the host application.

31. A method implemented in a user equipment (UE), comprising one or more of the actions described herein as performed by the wireless device 130.

35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs one or more of the actions described herein as performed by the wireless device 130.

36. The method of embodiment 35, further comprising:
at the UE, receiving the user data from the base station.

41. A user equipment (UE) configured to communicate with a base station, the UE comprising a radio interface and processing circuitry configured to perform one or more of the actions described herein as performed by the wireless device 130.

45. A communication system including a host computer comprising:
a communication interface configured to receive user data originating from a transmission from a user equipment (UE) to a base station,
wherein the UE comprises a radio interface and processing circuitry, the UE's processing circuitry configured to:
perform one or more of the actions described herein as performed by the wireless device 130.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising one or more of the actions described herein as performed by the wireless device 130.

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE performs one or more of the actions described herein as performed by the wireless device 130.

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A base station configured to communicate with a user equipment (UE), the base station comprising a radio interface and processing circuitry configured to perform one or more of the actions described herein as performed by the network node 102.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the network node 102.

66. The communication system of embodiment 65, further including the base station.
67. The communication system of embodiment 66, further including the UE, wherein the UE is configured to communicate with the base station.
68. The communication system of embodiment 67, wherein:
the processing circuitry of the host computer is configured to execute a host application;
the UE is configured to execute a client application associated with the host application, thereby providing the user data to be received by the host computer.
71. A method implemented in a base station, comprising one or more of the actions described herein as performed by the network node 102.
75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by the wireless device 130.
76. The method of embodiment 75, further comprising:
at the base station, receiving the user data from the UE.
77. The method of embodiment 76, further comprising:
at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
ACK Acknowledgement
AP Application Protocol
BSR Buffer Status Report
CA Carrier Aggregation
CE Control Element
CP Control Plane
DC Dual Connectivity
DCI Downlink Control Information
DL Downlink
DRB Data Radio Bearer
eNB (EUTRAN) base station
E-RAB EUTRAN Radio Access Bearer
FDD Frequency Division Duplex
gNB NR base station
GTP-U GPRS Tunneling Protocol-User Plane
IP Internet Protocol
LTE Long Term Evolution
MCG Master Cell Group
MAC Medium Access Control
MeNB Master eNB
MgNB Master gNB
MN Master Node
NACK Negative Acknowledgement
NR New Radio
PDCP Packet Data Convergence Protocol
PCell Primary Cell
PSCell Primary SCell
PUSCH Physical Uplink Shared Channel
RLC Radio Link Control
RLF Radio Link Failure
RRC Radio Resource Control
SCell Secondary Cell
SCG Secondary Cell GroupSCTP Stream Control Transmission Protocol
SeNB Secondary eNB
SN Secondary Node
SR Scheduling Request
SRB Signaling Radio Bearer
TDD Time Division Duplex
TEID Tunnel Endpoint IDentifier
TNL Transport Network Layer
UCI Uplink Control Information
UDP User Datagram Protocol
UE User Equipment
UL Uplink
UP User Plane
URLLC Ultra Reliable Low Latency Communication
X2 Interface between base stations
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method, performed by a wireless device, for handling a failure in a secondary cell serving the wireless device, wherein the secondary cell and a primary cell serve the wireless device with carrier aggregation, CA, in a wireless communications network, the method comprising:
determining the failure in the secondary cell, the determination being based on a determination that a percentage of radio link control failures, as compared to successful ones, are reached to a certain percentage within a time window and whether or not duplication is configured and/or applied, and
initiating sending an indication to a network node, being one of a first network node and a second network node, the indication being based on the determined failure of the secondary cell;
wherein the determining is based on whether or not Dual Connectivity, DC, is applied; and
wherein when the wireless device is operating in DC mode, after detecting the failure in the secondary cell, the secondary cell belonging to a first group of cells, the first group of cells being a Master Cell Group, MCG, the wireless device sends the indication comprising a failure report to the first network node, the first network node being a master node and a serving network node of the wireless device.

2. The method according to claim 1, wherein the wireless device is not operating in DC mode, and wherein after determining the failure in the secondary cell, the wireless device sends the indication, comprising a failure report, to the first network node, the first network node being a serving network node of the wireless device.

3. The method according to claim 1, wherein the wireless device is operating in DC mode, and wherein after detecting the failure in the secondary cell wherein the secondary cell belongs to a second group of cells, the second group of cells being a Secondary Cell Group, SCG, the wireless device sends the indication comprising a failure report to the second network node, the second network node being a secondary node and a serving network node of the wireless device.

4. The method according to claim 3, wherein the secondary cell is not a Primary Secondary Cell, PSCell.

5. The method according to claim 1, wherein the indication comprises information indicating the secondary cell where the radio link control failure has been detected.

6. The method according to claim 5, wherein the information indicating the secondary cell is a cell index of the secondary cell or an identity of a failed logical channel that was associated with the secondary cell.

7. The method according to claim 1, wherein the wireless device is operating in DC mode, and wherein after detecting the failure in the secondary cell, wherein the secondary cell belongs to a second group of cells, the second group of cells being a Secondary Cell Group, SCG, the wireless device sends the indication comprising a failure report to the first network node, the first network node being a master node and a serving network node of the wireless device.

8. The method according to claim 7, wherein the secondary cell is a Primary Secondary Cell, PSCell.

9. The method according to claim 8, wherein the failure report is an SCG failure information report.

10. The method according to claim 1, wherein method further comprises:
    initiating a first procedure based on the determined failure, the first procedure being at least one of:
    a suspension of a radio link control entity related to the failed radio link control, or failed secondary cell; or
    a deactivation of the duplication via the secondary cell where the radio link control failure has occurred.

11. A method, performed by a network node, for handling a failure in a secondary cell, the network node being one of a first network node and a second network node, wherein the secondary cell and a primary cell serve a wireless device with carrier aggregation, CA, in a wireless communications network, the method comprising:
    receiving an indication from the wireless device, the indication being based on a determined failure of the secondary cell, wherein the determination of the failure in the secondary cell is based on a determination that a percentage of radio link control failures, as compared to successful ones, are reached to a certain percentage within a time window, and
    initiating a second procedure based on the received indication, the second procedure comprising releasing of the secondary cell;
    wherein the wireless device is operating in DC mode, wherein the network node is a master node and a serving network node of the wireless device, wherein the secondary cell belongs to a first group of cells, the first group of cells being a Master Cell Group, MSG, and wherein the network node receives the indication comprising a failure report.

12. The method according to claim 11, wherein the wireless device is not operating in DC mode, wherein the network node is a serving network node of the wireless device, and wherein the network node receives the indication comprising a failure report.

13. A wireless device configured to handle a failure in a secondary cell configured to serve the wireless device, wherein the secondary cell and a primary cell are configured to serve the wireless device with carrier aggregation, CA, in a wireless communications network, the wireless device being further configured to:
    determine the failure in the secondary cell, the determination being configured to be based on a determination that a percentage of radio link control failures, as compared to successful ones, are reached to a certain percentage within a time window and whether or not duplication is configured and/or applied, and
    initiate sending an indication to a network node, the network node being configured to be one of a first network node and a second network node, the indication being configured to be based on the failure of the secondary cell configured to be determined;
    wherein to determine is based on whether or not Dual Connectivity, DC, is applied; and
    wherein the wireless device is configured to, where the wireless device is configured to be operating in DC mode, and after detecting the failure in the secondary cell, where the secondary cell is configured to belong to a first group of cells, the first group of cells being configured to be a Master Cell Group, MCG:
    send the indication comprising a failure report to the first network node, the first network node being configured to be a master node and a serving network node of the wireless device.

14. The wireless device according to claim 13, wherein the wireless device is configured to, where the wireless device is configured to not be operating in DC mode, and after determining the failure in the secondary cell:
    send the indication, comprising a failure report, to the first network node, the first network node being configured to be a serving network node of the wireless device.

15. The wireless device according to claim 13, wherein the wireless device is configured to, where the wireless device is configured to be operating in DC mode, and after detecting the failure in the secondary cell, where the secondary cell is configured to belong to a second group of cells, the second group of cells being configured to be a Secondary Cell Group, SCG:
    send the indication comprising a failure report to the second network node, the
    second network node being configured to be a secondary node and a serving network node of the wireless device.

16. A network node configured to handle a failure in a secondary cell, the network node being configured to be one of a first network node and a second network node, wherein the secondary cell and a primary cell are configured to serve a wireless device with carrier aggregation, CA, in a wireless communications network, the network node being further configured to:
    receive an indication from the wireless device, the indication being configured to be based on a failure of the secondary cell configured to be determined, wherein the determination of the failure in the secondary cell is configured to be based on a determination that a percentage of radio link control failures, as compared to successful ones, are reached to a certain percentage within a time window, and
    initiate a second procedure based on the received indication, the second procedure being configured to comprise releasing of the secondary cell;
    wherein the wireless device is configured to be operating in DC mode, wherein the network node is configured to be a master node and a serving network node of the wireless device, wherein the secondary cell is configured to belong to a first group of cells, the first group of cells being configured to be a Master Cell Group, MSG, and wherein the network node is configured to receive the indication comprising a failure report.

17. The network node according to claim 16, wherein the wireless device is configured to not be operating in DC mode, wherein the network node is configured to be a serving network node of the wireless device, and wherein the network node is configured to receive the indication comprising a failure report.

* * * * *